(12) United States Patent
Kim et al.

(10) Patent No.: US 10,353,626 B2
(45) Date of Patent: Jul. 16, 2019

(54) BUFFER MEMORY MANAGEMENT METHOD AND WRITE METHOD USING THE SAME

(71) Applicant: Samsung Electronics Co., Ltd., Suwon-si, Gyeonggi-do (KR)

(72) Inventors: Min-uk Kim, Incheon (KR); Ayberk Ozturk, San Jose, CA (US); Dinne Girish, Suwon-si (KR); Richard Neil Deglin, San Jose, CA (US); Geun-soo Kim, Suwon-si (KR); Du-won Hong, Osan-si (KR); Dong-hyuk Ihm, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 348 days.

(21) Appl. No.: 15/413,407

(22) Filed: Jan. 23, 2017

(65) Prior Publication Data
US 2017/0220296 A1    Aug. 3, 2017

Related U.S. Application Data

(60) Provisional application No. 62/290,933, filed on Feb. 3, 2016.

(30) Foreign Application Priority Data

Mar. 10, 2016  (KR) .................. 10-2016-0029104

(51) Int. Cl.
*G06F 3/06* (2006.01)

(52) U.S. Cl.
CPC ............ *G06F 3/0656* (2013.01); *G06F 3/061* (2013.01); *G06F 3/065* (2013.01); *G06F 3/0638* (2013.01); *G06F 3/0659* (2013.01); *G06F 3/0679* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 7,962,499 B2 | 6/2011 | Lam | |
| 8,090,905 B2 | 1/2012 | Stenfort | |
| 8,316,196 B1 | 11/2012 | Mullis et al. | |
| 9,003,119 B2 | 4/2015 | Sakai et al. | |
| 2007/0168793 A1* | 7/2007 | Seo ................. | G06F 11/1004 714/724 |

(Continued)

FOREIGN PATENT DOCUMENTS

| | | |
|---|---|---|
| JP | 2011150433 A | 8/2011 |
| JP | 2013073409 A | 4/2013 |

*Primary Examiner* — Brian R Peugh
(74) *Attorney, Agent, or Firm* — Renaissance IP Law Group LLP

(57) ABSTRACT

A method of performing a write operation, the method comprising: comparing a data pattern of a currently received command directing a write operation to data patterns of at least one previously received command; and performing a write operation, based on the currently received command directing the write operation, by writing the data patterns of the at least one previously received command instead of the data pattern of the currently received command when the data pattern of the currently received command directing the write operation is identical to the data patterns of the at least one previously received command

20 Claims, 33 Drawing Sheets

(56) References Cited

U.S. PATENT DOCUMENTS

| | | |
|---|---|---|
| 2013/0275660 A1 | 10/2013 | Bennett |
| 2014/0297988 A1 | 10/2014 | Ohyama et al. |
| 2014/0359245 A1 | 12/2014 | Jones et al. |
| 2015/0134871 A1 | 5/2015 | Benisty et al. |

* cited by examiner

BUFFER MEMORY MANAGEMENT METHOD AND WRITE METHOD USING THE SAME

CROSS-REFERENCE TO RELATED APPLICATION

This application claims priority from Korean Patent Application No. 10-2016-0029104 filed on Mar. 10, 2016 in the Korean Intellectual Property Office and U.S. Provisional Application No. 62/290,933 filed on Feb. 3, 2016, the disclosure of each is incorporated herein by reference in its entirety.

BACKGROUND

Embodiments relate to a storage device and a method of performing a command in the storage device, and more particularly, to a method of managing a buffer memory and a method of performing a write operation by using the method of managing a buffer memory.

A flash memory device that is a kind of non-volatile memory device has a faster operation speed and lower power consumption and thus is widely used in storage devices. A storage device such a flash memory device is used in a web server, a file server, or a database (DB) server in which many accesses occur.

SUMMARY

Embodiments include a method of performing a write operation, the method comprising: comparing a data pattern of a currently received command directing a write operation to data patterns of at least one previously received command; and performing a write operation, based on the currently received command directing the write operation, by writing the data patterns of the at least one previously received command instead of the data pattern of the currently received command when the data pattern of the currently received command directing the write operation is identical to the data patterns of the at least one previously received command.

Embodiments include a method of managing a buffer memory, the method comprising: receiving a command to write a data pattern; sequentially copying the data pattern of the command to the buffer memory if the data pattern is not identical to all data patterns stored in buffer memory; omitting copying the data pattern of the command to the buffer memory if the data pattern is identical to all data patterns stored in buffer memory; and writing at least one data pattern stored in the buffer memory in response to the command Embodiments include a method, comprising: receiving a command to write a data pattern; determining if the data pattern is the same as data patterns stored in a buffer memory; if the data pattern is not the same as the data patterns stored in the buffer memory: writing the data pattern to the buffer memory; and writing the data patterns written to the buffer memory to a memory device; and if the data pattern is the same as the data patterns stored in the buffer memory, writing at least one of the data patterns stored in the buffer memory to the memory device without writing the data pattern to the buffer memory.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Embodiments will be described more fully hereinafter with reference to the accompanying drawings, in which particular embodiments are shown.

Figure 1A:
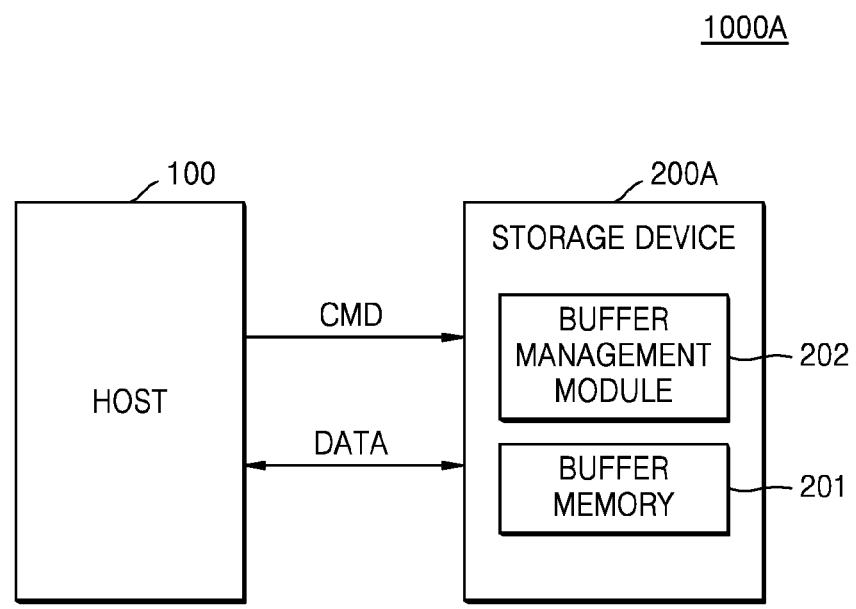
FIG. 1A is a diagram illustrating a configuration of a computing system according to an embodiment.

FIG. 1A is a diagram illustrating a configuration of a computing system 1000A according to an embodiment.

As illustrated in FIG. 1A, the computing system 1000A includes a host 100 and a storage device 200A.

For example, the computing system 1000A may be a personal computer, a set-top-box, a digital camera, a navigation device, a mobile device, or a smart card system. The storage device 200A may be a memory device, a solid state drive (SSD), a smart card, a hard disk drive (HDD), or the like.

The host 100 and the storage device 200A are electrically connected to each other. Various interface standards may be applied to an interface between the host 100 and the storage device 200A. For example, a universal flash storage (UFS) interface, an embedded multi-media card (eMMC) interface, a serial advanced technology attachment (SATA) interface, a serial advanced technology attachment express (SATAe) interface, a small computer system interface (SCSI), a small computer system interface express (SCSIe) interface, a non-volatile memory express (NVMe) interface, a peripheral component interconnect (PCI) interface, and a peripheral component interconnect express (PCIe) may be applied to the interface between the host 100 and the storage device 200A.

The host 100 may be configured to transmit a command CMD to the storage device 200A. The host 100 and the storage device 200A may be configured to send or receive data DATA to or from each other. The storage device 200A may be implemented in any of various forms. For example, the storage device 200A may be an embedded multi-media card (eMMC) or a universal flash storage (UFS). However, in other embodiments, the storage device 200A may take other forms.

The host 100 may be configured to transmit a command CMD, which is issued based on a task to be performed, to the storage device 200A. For example, the command CMD that is issued in the host 100 may include a command directing a write operation or a command directing a read operation. The command directing the write operation may include a write command or a write same command.

For example, the write same command may include a data pattern, a start logical block address (LBA), and length information. For example, the data pattern of the write same command may include one sector size. The write same command is a command that directs an operation of writing a data pattern into the storage device 200A by the number of times corresponding to length information from a start LBA. For example, the write same command may be used for performing a back patterning operation of writing the same data pattern in a specific storage area of the storage device 200A.

The host 100 may be configured to transmit data DATA to be stored in the storage device 200A to the storage device 200A or receive data DATA read from the storage device 200A. For example, in operation, when data to be processed is stored in the storage device 200A, the host 100 transmits a read command to the storage device 200A. When processed data is desired to be stored in the storage device 200A, the host 100 transmits a write command or a write same command to the storage device 200A.

As another example, when a page fault occurs, the host 100 may be configured to transmit one or more read commands and/or write commands, which perform at least one page-in operation and/or page-out operation for a memory swapping operation, to the storage device 200A. The page fault occurs when a page which the host 100 desires to read to perform an application process is not stored in the host 100.

The storage device 200A may be configured to perform a read operation or a write operation based on a command received from the host 100. For example, the storage device 200A may be configured to perform an operation, which is performed by hardware depending on a write command, by using software depending on a write same command.

The storage device 200A includes a buffer memory 201 and a buffer management module 202. Data to be written in the storage device 200A or data read from the storage device 200A is copied into the buffer memory 201. For example, the buffer memory 201 may include a ring buffer memory. The buffer management module 202 may be configured to manage an operation of copying data of a write command or a write same command into the buffer memory 201.

For example, the buffer management module 202 may be configured to perform an operation of sequentially copying data of a command received from the host 100 into the buffer memory 201. When a write same command having a data pattern that is the same as that copied into the buffer memory 201 is received in a state in which the same data pattern has been copied into all page buffers in the buffer memory 201, the buffer management module 202 may be configured to skip an operation of copying data of the write same command into the buffer memory 201. Accordingly, the overhead of firmware processing that is used for copying the data of the write same command into the buffer memory 201 may be reduced.

When a write same command having a data pattern that is the same as that copied into the buffer memory 201 is received in a state in which the same data pattern has been copied into all page buffers in the buffer memory 201, the storage device 200 may be configured to skip an operation of copying data of the write same command into the buffer memory 201 and perform a write operation, based on the write same command, by using the data copied into the buffer memory 201. Accordingly, a write operation that depends on a write same command may be performed by reusing data patterns of previously received commands.

Figure 17:
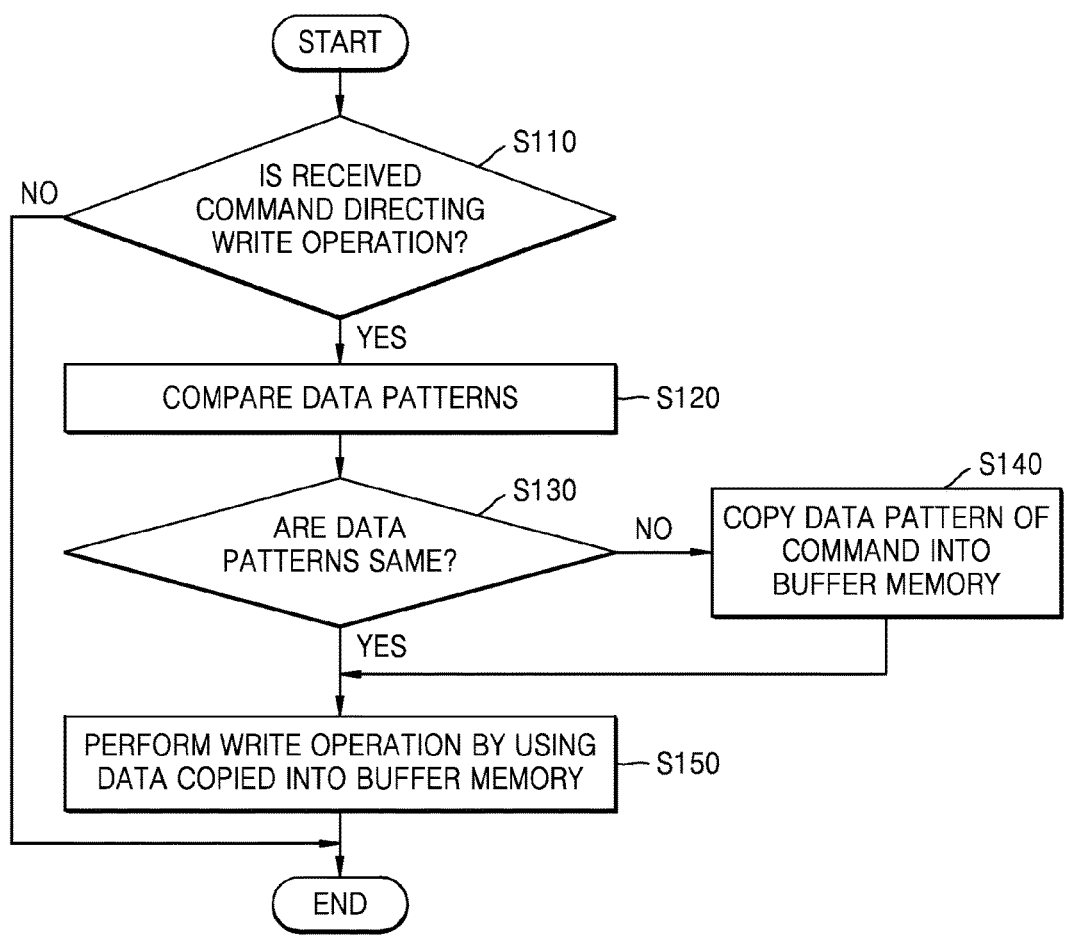
FIG. 17 is a flowchart of a method of performing a write operation, according to an embodiment.
Figure 18:
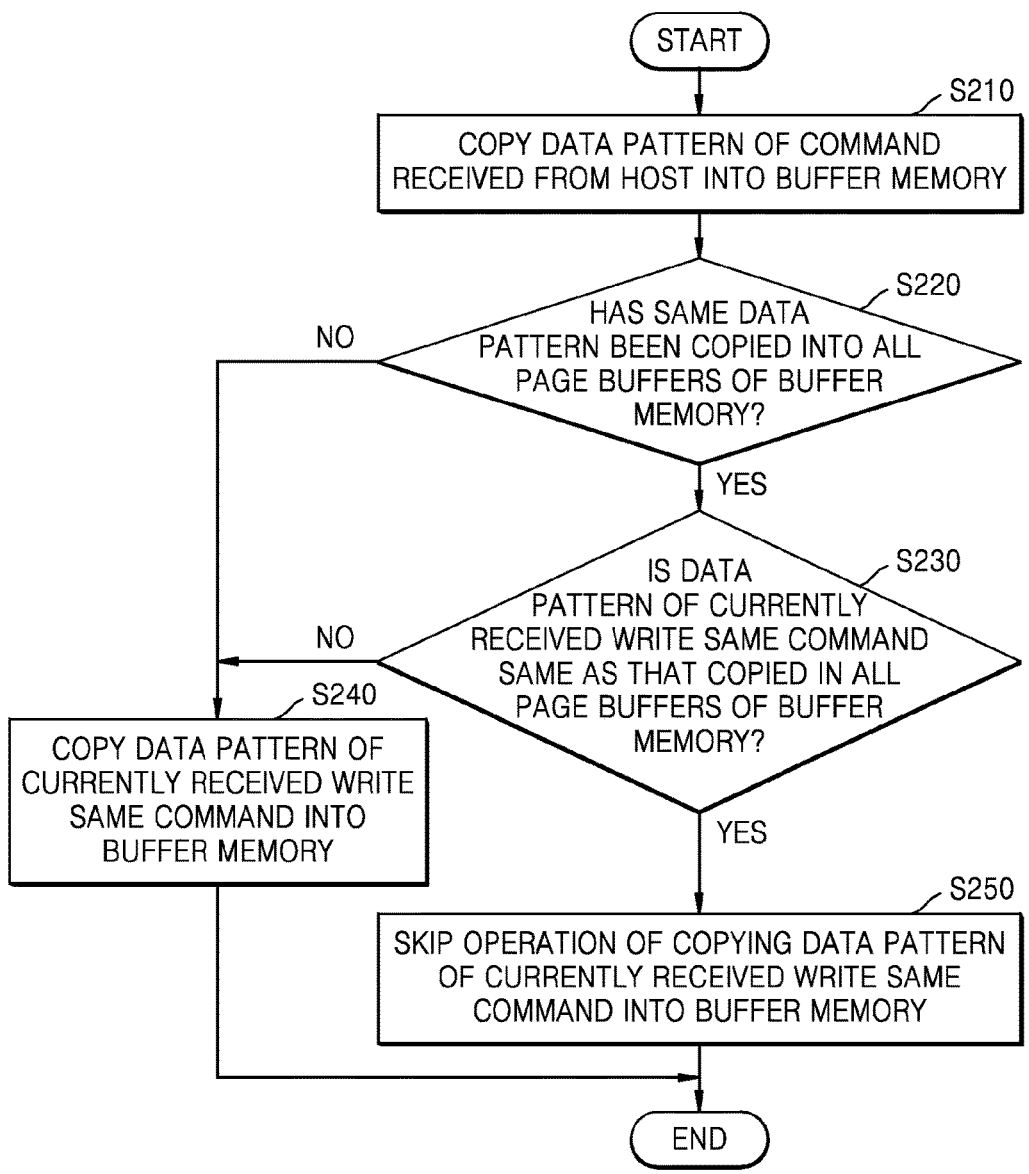
FIG. 18 is a flowchart of a method of managing a buffer memory, according to an embodiment.
Figure 19:
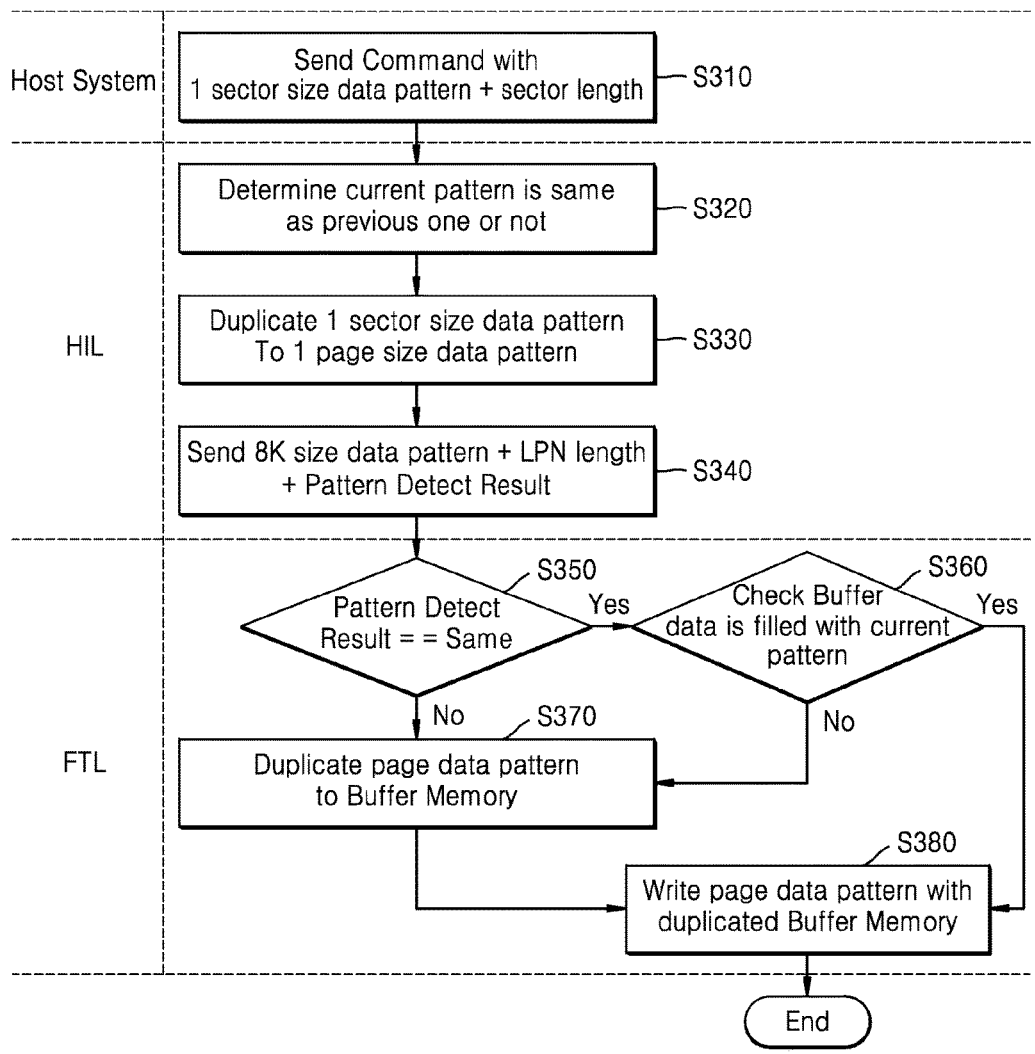
FIG. 19 is a flowchart of a write operation method that is performed in a computing system, according to an embodiment.

For example, the buffer management module 202 may include program codes for performing a write operation-performing method or buffer memory management method as illustrated in FIGS. 17 to 19.

Figure 1B:
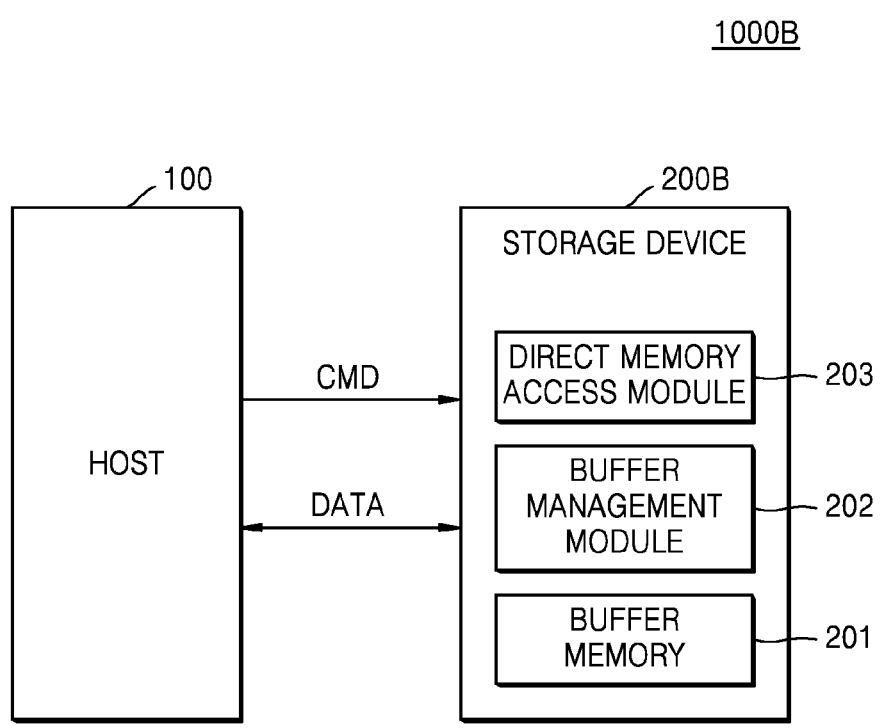
FIG. 1B is a diagram illustrating a configuration of a computing system according to another embodiment.

FIG. 1B is a diagram illustrating a configuration of a computing system 1000B according to another embodiment. As illustrated in FIG. 1B, the computing system 1000B includes a host 100 and a storage device 200B. The host 100 of FIG. 1B is the same as the host 100 of FIG. 1A, and thus, repeated descriptions thereof are omitted. The storage device 200B has a configuration in which a direct memory access (DMA) module 203 is added to the storage device 200A illustrated in FIG. 1A.

In other words, the storage device 200B includes a buffer memory 201, a buffer management module 202, and the DMA module 203. The buffer memory 201 and the buffer management module 202 have been described above with reference to FIG. 1A, and thus, repeated descriptions thereof are omitted.

The direct memory access module 203 may be configured to support an operation of copying data into the buffer memory 201 without a program execution by a central processing unit (CPU) of the storage device 200B. Accordingly, the direct memory access module 203 may be configured to perform an operation of copying data to the buffer memory 201 in parallel with an operation of executing in firmware a write command or a write same command. Due to this, execution time of a write command or write same command may be reduced.

Figure 2A:
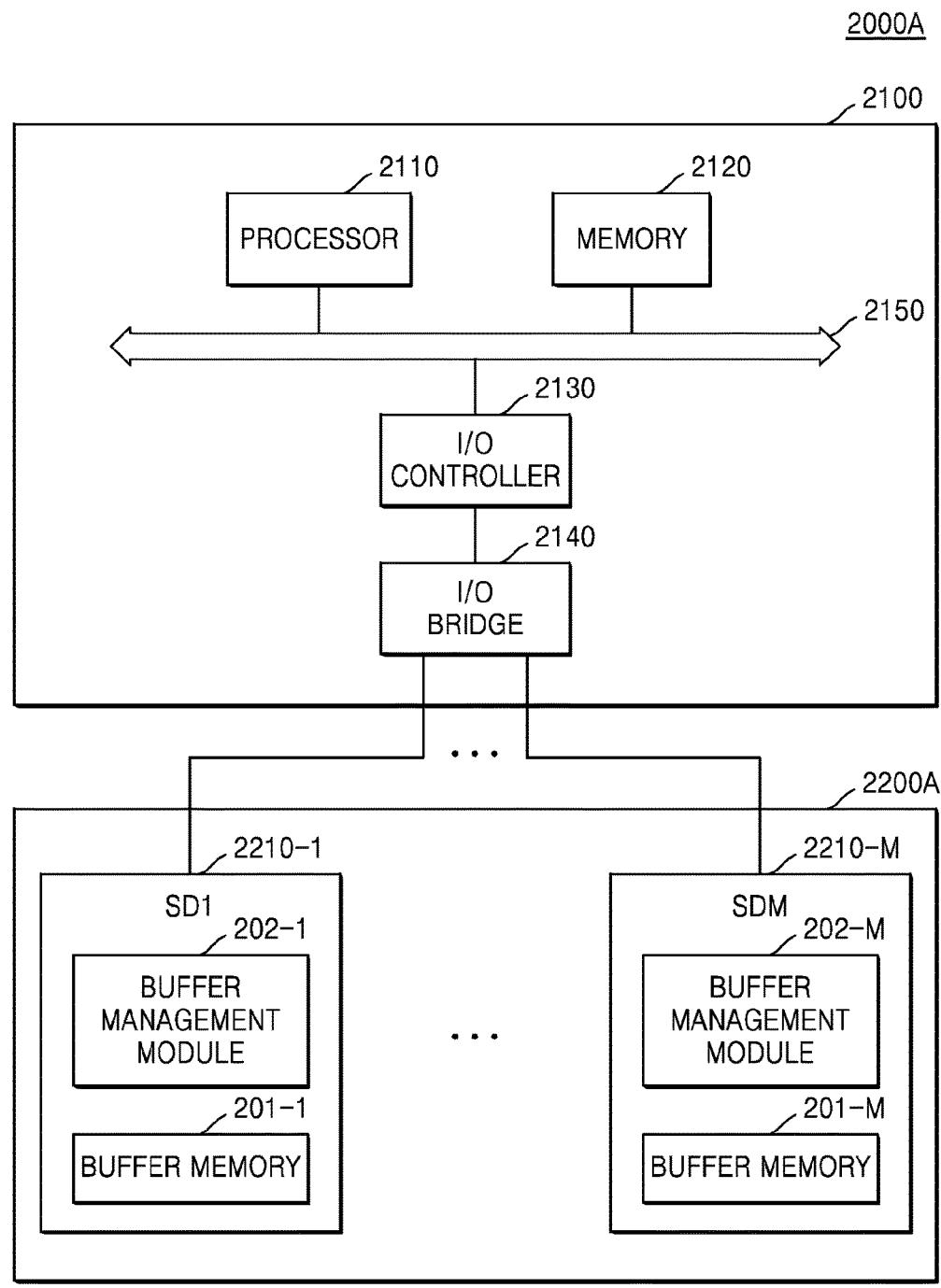
FIG. 2A is a diagram illustrating a configuration of a computing system according to another embodiment.

FIG. 2A is a diagram illustrating a configuration of a computing system 2000A according to another embodiment. As illustrated in FIG. 2A, the computing system 2000A includes a host 2100 and an input/output (I/O) device block 2200A.

The host 2100 includes a processor 2110, a memory 2120, an I/O controller 2130, and I/O bridge 2140, and a host bus 2150. The I/O device block 2200A includes multiple storage devices 2210-1 to 2210-M (where M is an integer that is equal to or greater than 2).

For example, the computing system 2000A may be a personal computer, a set-top-box, a digital camera, a navigation device, a mobile device, a smart card system, or the like. Each of the storage devices 2210-1 to 2210-M of the I/O device block 2200A may include a memory device, an SSD, a smart card, an HDD, or the like.

The processor 2110 may include circuits, interfaces, or program codes for controlling operations of components of the computing system 2000A. For example, the processor 2110 may include a CPU, an ARM, or an application specific integrated circuit (ASIC).

The memory 2120 may include a static random access memory (SRAM) and/or a dynamic random access memory (DRAM) configured to store data, commands, or program codes which are necessary for an operation of the computing system 2000A. Also, the memory 2120 may include a non-volatile memory.

The processor 2110 may be configured to execute programs stored in the memory 2120 to control operations of components of the computing system 2000A.

The I/O controller 2130 may be configured to control the storage devices 2210-1 to 2210-M of the I/O device block 2200A. The I/O controller 2130 may be configured to receive an I/O command from the processor 2110 and control the storage devices 2210-1 to 2210-M based on the received I/O command.

Components of the host 2100 are electrically connected to the host bus 2150. Data and signals may be transmitted between the components of the host 2100 via the host bus 2150.

The I/O bridge 2140 may be configured to control a channel for data communication between the host 2100 and the storage devices 2210-1 to 2210-M. For example, the I/O bridge 2140 may be implemented with a PCIe bridge, a serial attached SCSI (SAS) bridge, a network bridge, or the like.

For example, each of the storage devices 2210-1 to 2210-M of the I/O device block 2200A may be implemented with the storage device 200A as illustrated in FIG. 1A. As another example, each of the storage devices 2210-1 to 2210-M may be implemented with an SSD, an HDD, or the like. The storage devices 2210-1 to 2210-M may be the same, similar, or different types of storage devices. Each of the storage devices 2210-1 to 2210-M includes a buffer memory 201-M and a buffer management module 202-M. Operations of the buffer memory 201-M and the buffer management module 202-M are substantially the same as those of the buffer memory 201 and the buffer management module 202, illustrated in FIG. 1A, and thus, repeated descriptions thereof are omitted.

Figure 2B:
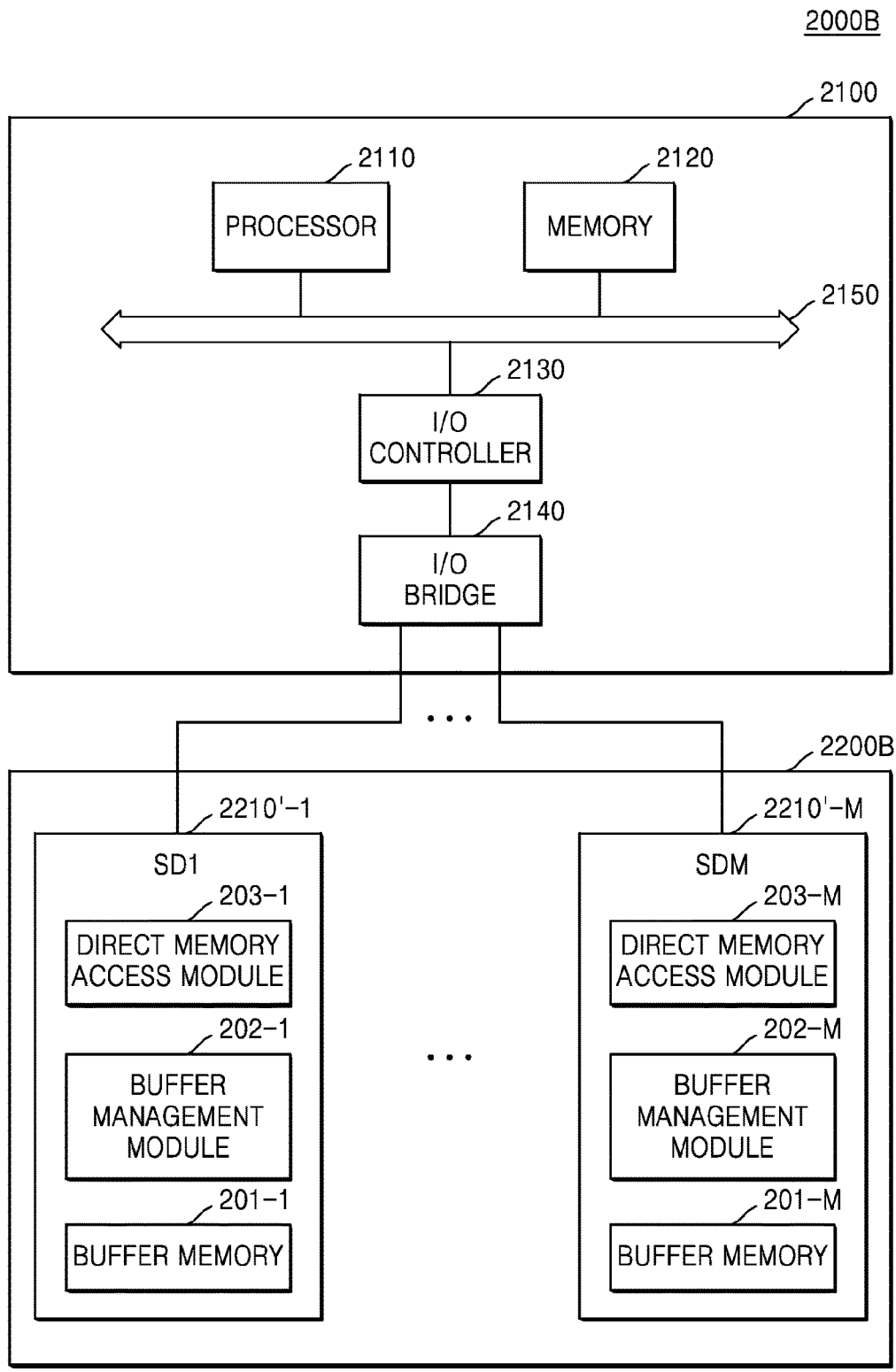
FIG. 2B is a diagram illustrating a configuration of a computing system according to another embodiment.

FIG. 2B is a diagram illustrating a configuration of a computing system 2000B according to another embodiment. As illustrated in FIG. 2B, the computing system 2000B includes a host 2100 and an I/O device block 2200B. The host 2100 of FIG. 2B is the same as the host 2100 of FIG. 2A, and thus, repeated descriptions thereof are omitted.

The I/O device block 2200B includes multiple storage devices 2210'-1 to 2210'-M (where M is an integer that is equal to or greater than 2). For example, each of the storage devices 2210'-1 to 2210'-M of the I/O device block 2200B may be implemented with the storage device 200B as illustrated in FIG. 1B. As another example, each of the storage devices 2210'-1 to 2210'-M may be implemented with an SSD, an HDD, or the like. Each of the storage devices 2210'-1 to 2210'-M includes a buffer memory 201-M, a buffer management module 202-M, and a direct memory access module 203-M. Operations of the buffer memory 201-M, the buffer management module 202-M, and the direct memory access module 203-M are substantially the same as those of the buffer memory 201, the buffer management module 202, and the direct memory access module 203, illustrated in FIG. 1B, and thus, repeated descriptions thereof are omitted.

Figure 3A:
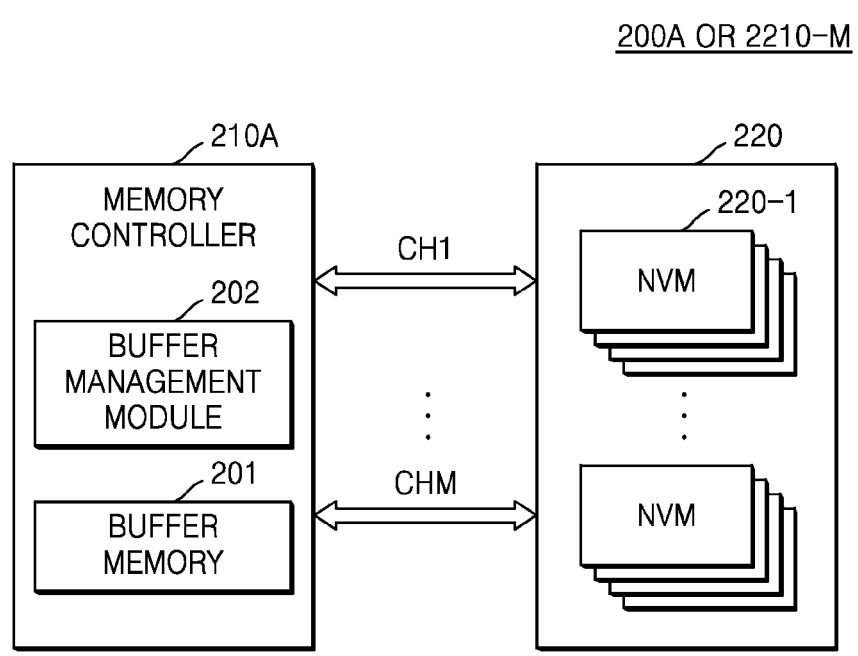
FIG. 3A is a diagram illustrating a detailed configuration of a storage device illustrated in FIG. 1A or FIG. 2A according to an embodiment.

FIG. 3A is a diagram illustrating a detailed configuration of the storage device 200A or 2210-M illustrated in FIG. 1A or FIG. 2A according to an embodiment. As illustrated in FIG. 3A, the storage device 200A or 2210-M includes a memory controller 210A and a memory device 220.

The memory device 220 may include one or more non-volatile memories 220-1. For example, each of the non-volatile memories 220-1 in the memory device 220 may include a flash memory, a phase change RAM (PRAM), a ferroelectric RAM (FRAM), a magnetic RAM (MRAM), a resistance random access memory (RRAM), a nanofloating gate memory (NFGM), a polymer random access memory (PoRAM), or the like. As another example, the memory device 220 may include a mixture of at least one non-volatile memory and at least one volatile memory or a mixture of at least two types of non-volatile memories. For example, when the memory device 220 is implemented with a non-volatile memory device such as a flash memory, the storage device 200A or 2210-M may be an SSD.

The memory controller 210A may be configured to control the memory device 220 based on a command received from a host. The memory controller 210A may be configured to control program (or write), read, and erase operations for the memory device 220 connected via multiple channels CH1 to CHM, depending on a command received from a host.

Channels for transmitting signals necessary to perform an operation are formed between the memory controller 210A and the memory device 220. The signals necessary to perform an operation may include, for example, a command, an address, and data.

The memory controller 210A includes a buffer memory 201 and a buffer management module 202. The buffer memory 201 and the buffer management module 202 of FIG. 3A are the same as the buffer memory 201 and the buffer management module 202 of FIG. 1A, respectively, and thus, repeated descriptions thereof are omitted.

The memory controller 210A may be configured to copy data to be written in the memory device 220 or data read from the memory device 220 into the buffer memory 201 by using the buffer management module 202. For example, when a write same command having a data pattern that is the same as that copied into the buffer memory 201 is received in a state in which the same data pattern has been copied into all page buffers in the buffer memory 201, the memory controller 210A skips an operation of copying data of the write same command into the buffer memory 201. Accordingly, the overhead of firmware processing in the memory controller 210A which is used for copying the data of the write same command into the buffer memory 201 may be reduced.

Figure 3B:
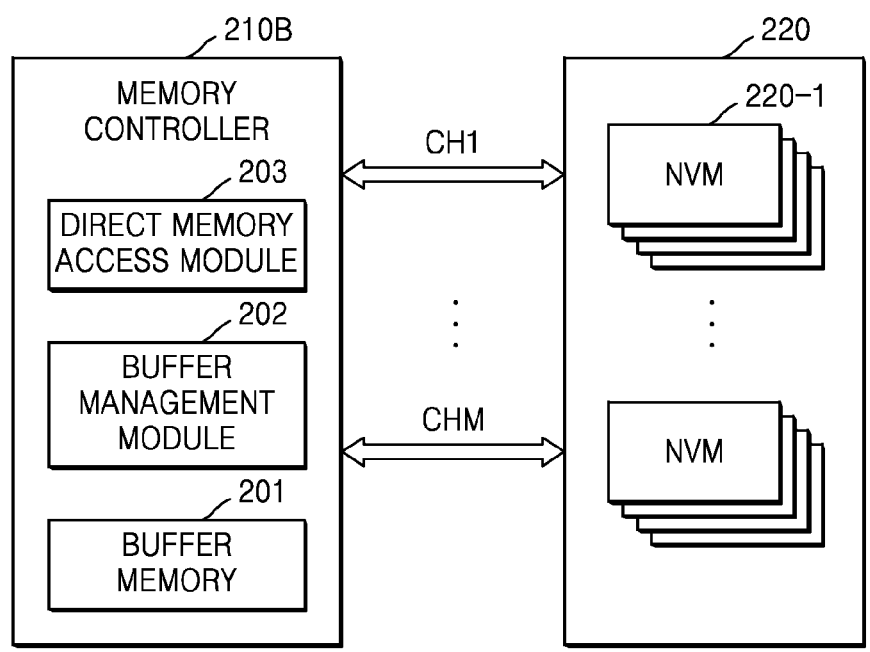
FIG. 3B is a diagram illustrating a detailed configuration of a storage device illustrated in FIG. 1B or 2B according to an embodiment.

The memory controller 210A may be configured to transmit data copied into the buffer memory 201 to the memory device 220 and perform a write operation that depends on a write same command Accordingly, the memory controller 210A may be configured to perform a write operation, which depends on a write same command, by reusing data patterns of previously received commands FIG. 3B is a diagram illustrating a detailed configuration of the storage device 200B or 2210'-M illustrated in FIG. 1B or 2B according to an embodiment. As illustrated in FIG. 3B, the storage device 200B or 2210'-M includes a memory controller 210B and a memory device 220. The memory device 220 of FIG. 3B is the same as the memory device 220 of FIG. 3A, and thus, repeated descriptions thereof are omitted.

The memory controller 210B may be similar to the memory controller 210A of FIG. 3A. However, the memory controller 210B includes a direct memory access module 203. In addition, the buffer memory 201, the buffer management module 202, and the direct memory access module 203 of FIG. 3B are the same as the buffer memory 201, the buffer management module 202, and the direct memory access module 203 of FIG. 1B, respectively, and thus, repeated descriptions thereof are omitted.

The memory controller 210B may be configured to perform an operation of copying data to the buffer memory 201 in parallel with an operation of executing in firmware a write command or a write same command, by using the buffer management module 202 and the direct memory access module 203. In detail, the memory controller 210B may be configured to copy data to be written in the memory device 220 or data read from the memory device 220 into the buffer memory 201 by using the buffer management module 202. In particular, the memory controller 210B may perform an operation of copying data into the buffer memory 201, in parallel with an operation of executing in firmware a command, by using the direct memory access module 203.

Figure 4A:
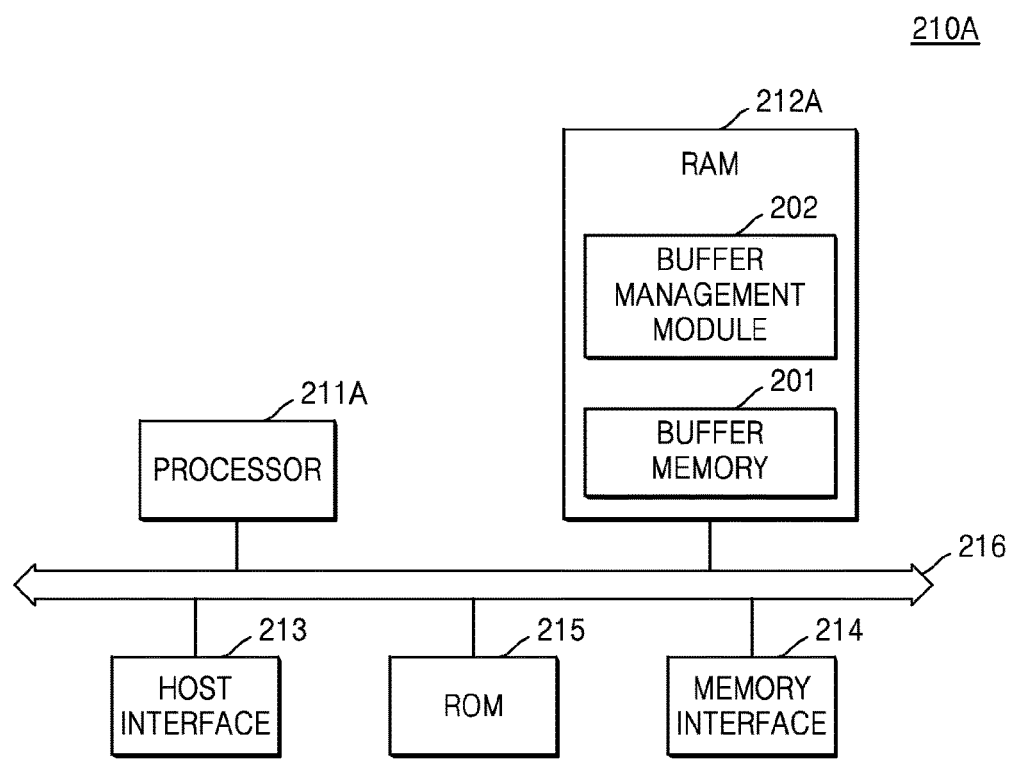
FIG. 4A is a diagram illustrating a configuration of a memory controller illustrated in FIG. 3A according to an embodiment.

FIG. 4A is a diagram illustrating a configuration of the memory controller 210A illustrated in FIG. 3A according to an embodiment. As illustrated in FIG. 4A, the memory controller 210A includes a processor 211A, RAM 212A, a host interface 213, a memory interface 214, read only memory (ROM) 215, and a bus 216.

The bus 216 is configured to transmit data and signals between components of the memory controller 210A.

The processor 211A may be configured to control overall operations of the storage device 200A or 2210-M by using program codes and data stored in the RAM 212A. When the storage device 200A or 2210-M is initialized, the processor 211A may be configured to read program codes and data necessary to control the operations of the storage device 200A or 2210-M, stored in the memory device 220, and load the same onto the RAM 212A.

The RAM 212A may be configured to operate according to the control of the processor 211A and include an area for a buffer memory 201. Software for a buffer management module 202 may be loaded onto the RAM 212A. In addition, program codes for a process that is performed in a host interface layer (HIL) and program codes for a process that is performed in a flash translation layer (FTL) may be loaded onto the RAM 212A. Although particular types of program codes have been used as examples, in other embodiments, different types of program codes may be loaded onto the RAM 212A.

The host interface 213 may be configured to implement a protocol for exchanging data with a host connected to the memory controller 210A and perform an interface operation between the memory controller 210A and the host. The host interface 213 may be implemented as an advanced technology attachment (ATA) interface, an SATA interface, a parallel advanced technology attachment (PATA) interface, a universal serial bus (USB) or serial attached small computer system (SAS) interface, an SCSI, an eMMC interface, nonvolatile memory express (NVMe), a UFS interface, a PCI interface, or a PCIe interface. However, the host interface 213 is not limited to these particular examples. The host interface 213 may be configured to receive a command and data from the host or transmit data to the host, according to the control of the processor 211A.

The memory interface 214 may be electrically connected to a memory device, such as the memory device 220 of FIGS. 3A or 3B. The memory interface 214 may be configured to transmit a command, an address, and data to the memory device 220 or receive data from the memory device 220, according to the control of the processor 211A. The memory interface 214 may be configured to support NAND flash memory, NOR flash memory, or the like. The memory interface 214 may ay be configured to perform software or hardware interleave operations through multiple channels.

The ROM 215 may be configured to store code information necessary for initial booting of a device including a storage device.

The processor 211A may be configured to drive the software for the buffer management module 202, loaded in the RAM 212A, and copy data to be written in the memory device 220 or data read from the memory device 220 into the buffer memory 201. For example, in operation, when a write same command having a data pattern that is the same as that copied into the buffer memory 201 is received in a state in which the same data pattern has been copied into all page buffers in the buffer memory 201, the processor 211A skips an operation of copying data of the write same command into the buffer memory 201.

In addition, the processor 211A may be configured to perform a firmware processing in an HIL and an FTL with respect to a command received from a host. The processor 211A may be configured to transmit data copied into the buffer memory 201 in addition a command to the memory device 220, based on the firmware processing in the HIL and the FTL. Accordingly, the memory device 220 may be configured to perform a write operation that depends on a write same command.

Figure 4B:
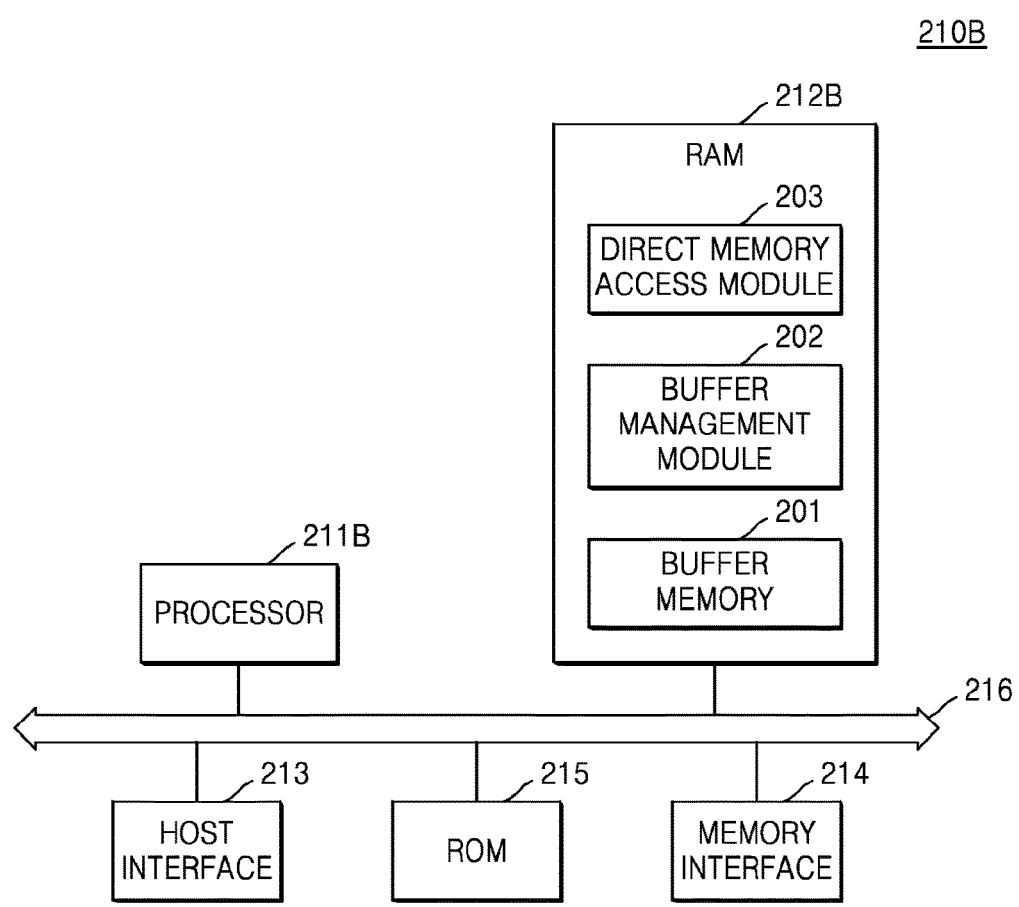
FIG. 4B is a diagram illustrating a configuration of a memory controller illustrated in FIG. 3B according to an embodiment.

FIG. 4B is a diagram illustrating a configuration of the memory controller 210B illustrated in FIG. 3B according to an embodiment. As illustrated in FIG. 4B, the memory controller 210B includes a processor 211B, RAM 212B, a host interface 213, a memory interface 214, ROM 215, and a bus 216. The host interface 213, the memory interface 214, the ROM 215, and the bus 216 of FIG. 4B are the same as the host interface 213, the memory interface 214, the ROM 215, and the bus 216 of FIG. 4A, and thus, repeated descriptions thereof are omitted.

The processor 211B and the RAM 212B may be similar to the processor 211A and the RAM 212A of FIG. 4A.

However, the processor 211B may be configured to operate according to the direct memory access module 203 loaded onto the RAM 212B.

The processor 211B may be configured to drive the software for the buffer management module 202, loaded in the RAM 212B, and copy data to be written in the memory device 220 or data read from the memory device 220 into the buffer memory 201. In particular, the processor 211B may be configured to perform an operation of copying data into the buffer memory 201, in parallel with an operation of executing in firmware a command, by using the direct memory access module 203. For example, when a write same command having a data pattern that is the same as that copied into the buffer memory 201 is received in a state in which the same data pattern has been copied into all page buffers in the buffer memory 201, the processor 211B skips an operation of copying data of the write same command into the buffer memory 201.

Figure 5:
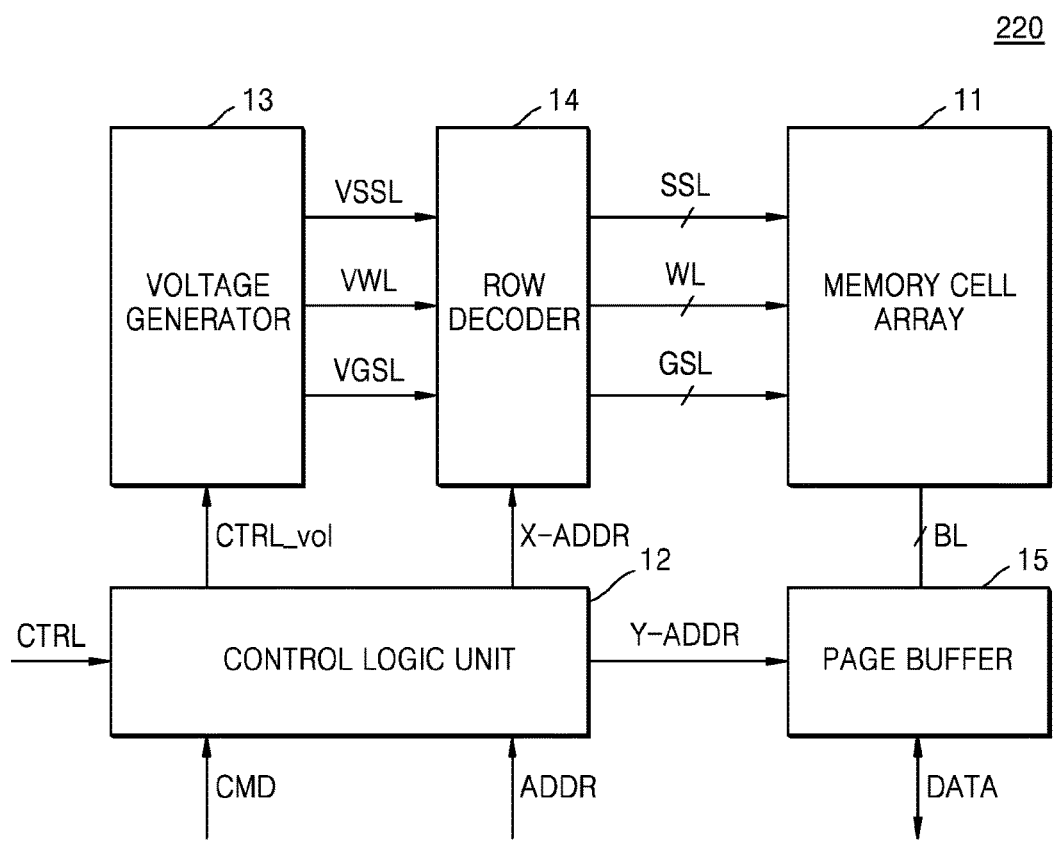
FIG. 5 is a diagram illustrating a detailed configuration of a memory device illustrated in FIG. 3A or 3B according to an embodiment.

FIG. 5 is a diagram illustrating a detailed configuration of the memory device 220 illustrated in FIG. 3A or 3B according to an embodiment. Referring to FIG. 5, the memory device 220 may include a memory cell array 11, a control logic unit 12, a voltage generator 13, a row decoder 14, and a page buffer 15. The components included in the memory device 220 will now be described in detail.

The memory cell array 11 may be connected to at least one string selection line SSL, multiple word lines WL, and at least one ground selection line GSL, and may also be connected to multiple bit lines BL. The memory cell array 11 may include multiple memory cells MC that are disposed at intersections of the bit lines BL and the word lines WL.

When an erasure voltage is applied to the memory cell array 11, the memory cells MC enter an erasure state. When a programming voltage is applied to the memory cell array 11, the memory cells MC enter a program state. In the program state, each memory cell MC may be in one of multiple potential states, such as an erasure state and first through n-th program states P1 through Pn. These states may be distinguished from each other according to a threshold voltage.

In the first through n-th program states P1 through Pn, n may be a natural number equal to or greater than 2. For example, when each memory cell MC is a 2-bit level cell, n may be 3. In another example, when each memory cell MC is a 3-bit level cell, n may be 7. In another example, when each memory cell MC is a 4-bit level cell, n may be 15. As such, the memory cells MC may include multi-level cells. However, embodiments are not limited thereto, and the memory cells MC may include single-level cells.

The control logic unit 12 may be configured to receive a command signal CMD, an address signal ADDR, and a control signal CTRL from the memory controller 210A to output various control signals for writing the data DATA to the memory cell array 11 or for reading the data from the memory cell array 11. In this way, the control logic unit 12 may be configured to control overall operations of the memory device 220.

The various control signals output by the control logic unit 12 may be provided to the voltage generator 13, the row decoder 14, and the page buffer 15. In detail, the control logic unit 12 may be configured to provide a voltage control signal CTRL_vol to the voltage generator 13, provide a row address signal X_ADDR to the row decoder 14, and provide a column address signal Y_ADDR to the page buffer 15.

The voltage generator 13 may be configured to receive the voltage control signal CTRL_vol to generate various voltages for executing a program operation, a read operation and an erasure operation with respect to the memory cell array 11. In detail, the voltage generator 13 may be configured to generate a first drive voltage VWL for driving the word lines WL, a second drive voltage VSSL for driving the at least one string selection line SSL, and a third drive voltage VGSL for driving the at least one ground selection line GSL.

The first drive voltage VWL may be a program (or write) voltage, a read voltage, an erasure voltage, a pass voltage, or a program verification voltage. The second drive voltage VSSL may be a string selection voltage, such as an on voltage or an off voltage. The third drive voltage VGSL may be a ground selection voltage, such as an on voltage or an off voltage.

The row decoder 14 may be connected to the memory cell array 11 through the word lines WL and may be configured to activate some of the word lines WL in response to the row address signal X_ADDR received from the control logic unit 12. In detail, during a read operation, the row decoder 14 may apply a read voltage to a word line selected from the word lines WL and apply a pass voltage to the remaining unselected word lines.

During a program operation, the row decoder 14 may apply a program voltage to the selected word line and apply the pass voltage to the unselected word lines. According to the present embodiment, the row decoder 14 may apply a program voltage to the selected word line and an additionally selected word line, in at least one selected from multiple program loops.

The page buffer 15 may be connected to the memory cell array 11 via the bit lines BL. In detail, during a read operation, the page buffer 15 may operate as a sense amplifier so as to output data DATA stored in the memory cell array 11. During a program operation, the page buffer 15 may operate as a write driver so as to input the data DATA desired to be stored in the memory cell array 11. In the process of executing a write command or a write same command, data copied into the buffer memory 201 of the memory controller 210A or 210B is loaded in the page buffer 15.

Figure 6:
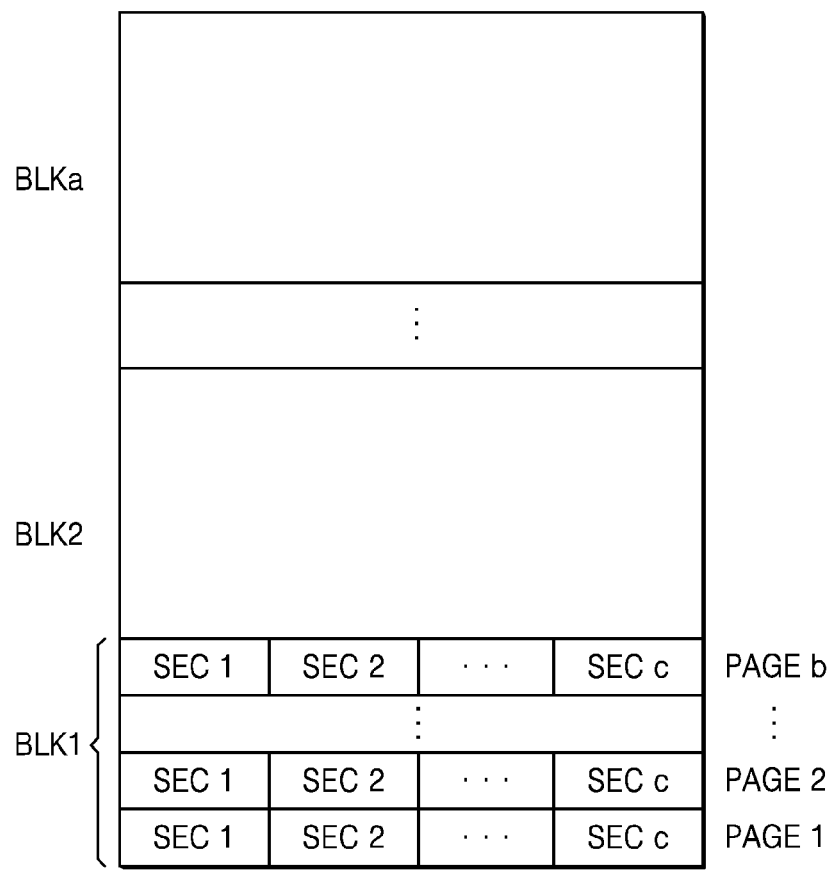
FIG. 6 is a diagram illustrating a memory cell array illustrated in FIG. 5 according to an embodiment.

FIG. 6 is a diagram illustrating the memory cell array 11 illustrated in FIG. 5 according to an embodiment. Referring to FIG. 6, the memory cell array 11 may be a flash memory cell array. In this case, the memory cell array 11 may include multiple memory blocks BLK1 to BLKa (where "a" denotes a positive integer which is equal to or greater than two) and each of the memory blocks BLK1 to BLKa may include multiple pages PAGE1 to PAGEb (where "b" denotes a positive integer which is equal to or greater than two). In addition, each of the pages PAGE1 to PAGEb may include multiple sectors SEC1 to SECc (where "c" denotes a positive integer which is equal to or greater than two). Although only the pages PAGE1 to PAGEb and the sectors SEC1 to SECc of the memory block BLK1 are illustrated for convenience of explanation in FIG. 7, the other memory blocks BLK2 to BLKa may have the same structures as that of the memory block BLK1.

Figure 7:
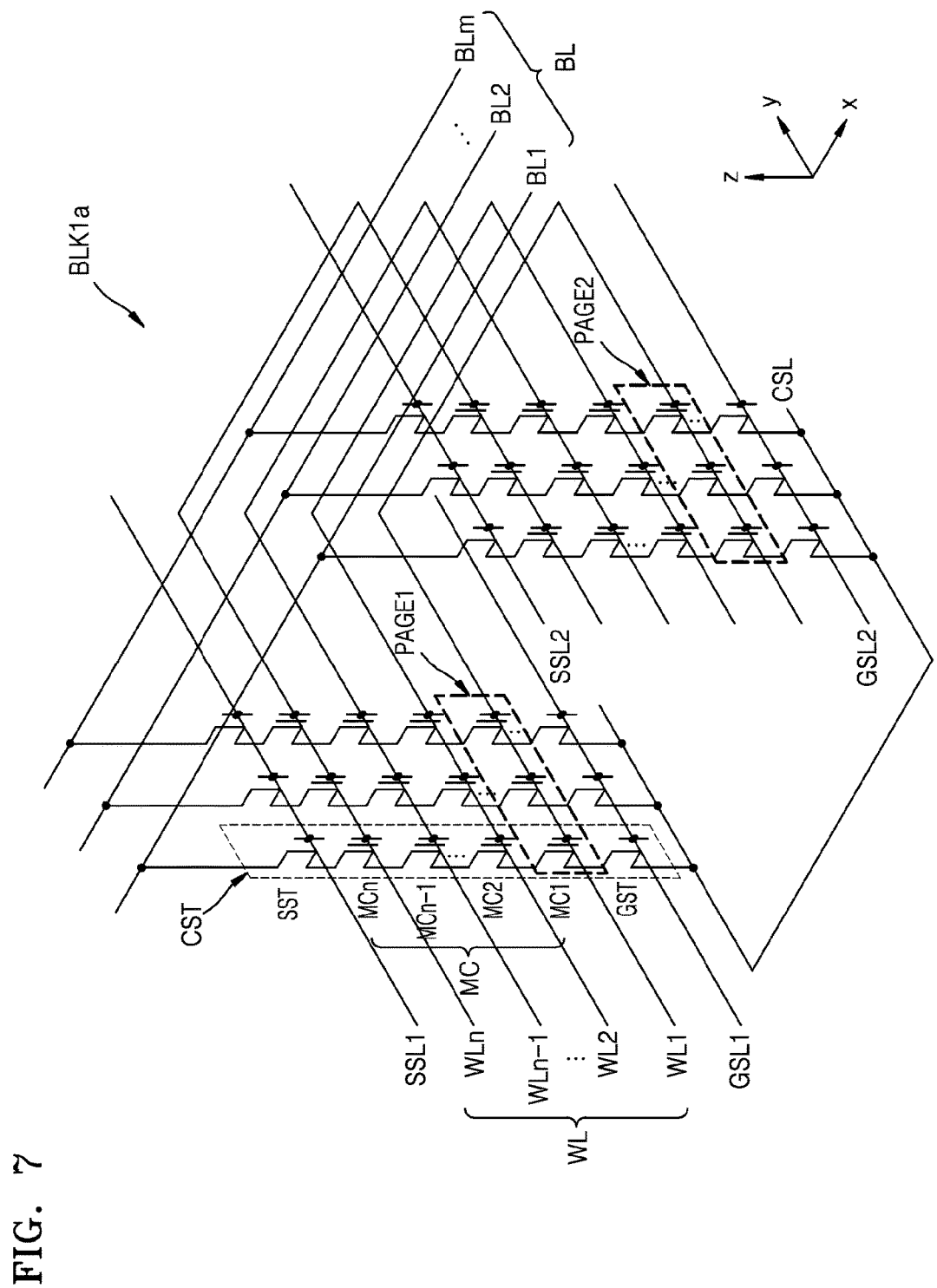
FIG. 7 is a circuit diagram of a first memory block, which is an example of a memory block included in the memory cell array of FIG. 6 according to an embodiment.

FIG. 7 is a circuit diagram of a first memory block BLK1a, which is an example of the memory block BLK1 included in the memory cell array 11 of FIG. 6 according to an embodiment. Referring to FIG. 7, the first memory block BLK1a may be a NAND flash memory having a vertical structure. Each of the memory blocks BLK1 to BLKa illustrated in FIG. 6 may be implemented as shown in FIG. 7. In FIG. 7, a first direction is referred to as an x direction, a second direction is referred to as a y direction, and a third direction is referred to as a z direction. However, embodiments are not limited thereto, and the first through third directions may vary.

The first memory block BLK1a may include multiple cell strings CST, multiple word lines WL, multiple bit lines BL, multiple ground selection lines GSL1 and GSL2, multiple string selection lines SSL1 and SSL2, and a common source line CSL. The number of cell strings CST, the number of word lines WL, the number of bit lines BL, the number of ground selection lines GSL1 and GSL2, and the number of string selection lines SSL1 and SSL2 may vary among different embodiments.

Each of the cell strings CST may include a string selection transistor SST, multiple memory cells MC, and a ground selection transistor GST that are serially connected to each other between a bit line BL corresponding to the cell string CST and the common source line CSL. However, embodiments are not limited thereto. According to another embodiment, each cell string CST may further include at least one dummy cell. According to another embodiment, each cell string CST may include at least two string selection transistors SST or at least two ground selection transistors GST.

Each cell string CST may extend in the third direction (z direction). In detail, each cell string CST may extend on a substrate in a vertical direction (z direction). Accordingly, the first memory block BLK1a including the cell strings CST may be referred to as a vertical-direction NAND flash memory. As such, by extending each cell string CST in the vertical direction (z direction) on a substrate, the integration density of the memory cell array 11 may increase.

The word lines WL may each extend in the first direction x and the second direction y, and each word line WL may be connected to memory cells MC corresponding thereto. Accordingly, multiple memory cells MC arranged adjacent to each other on the same plane in the first direction x and the second direction y may be connected to each other by an identical word line WL. In detail, each word line WL may be connected to gates of memory cells MC to control the memory cells MC. In this case, the memory cells MC may be configured to store data and be programmed, read, or erased under the control of the connected word line WL.

The bit lines BL may extend in the first direction x and may be connected to the string selection transistors SST. Accordingly, multiple string selection transistors SST arranged adjacent to each other in the first direction x may be connected to each other by an identical bit line BL. In detail, each bit line BL may be connected to drains of the string selection transistors SST.

The string selection lines SSL1 and SSL2 may each extend in the second direction y and may be connected to the string selection transistors SST. Accordingly, multiple string selection transistors SST arranged adjacent to each other in the second direction y may be connected to each other by an identical string selection line SSL1 or SSL2. In detail, each string selection line SSL1 or SSL2 may be connected to gates of the string selection transistors SST to control the string selection transistors SST.

The ground selection lines GSL1 and GSL2 may each extend in the second direction y and may be connected to the ground selection transistors GST. Accordingly, multiple ground selection transistors GST arranged adjacent to each other in the second direction y may be connected to each other by an identical ground selection line GSL1 or GSL2. In detail, each ground selection line GSL1 or GSL2 may be connected to gates of the ground selection transistors GST to control the ground selection transistors GST.

The ground selection transistors GST respectively included in the cell strings CST may be connected to each other by the common source line CSL. In detail, the common source line CSL may be connected to sources of the ground selection transistors GST.

Multiple memory cells MC connected to an identical word line WL and to an identical string selection line SSL1 or SSL2 and arranged adjacent to each other in the second direction y may be referred to as a page PAGE. For example, multiple memory cells MC that are connected to a first word line WL1 and to a first string selection line SSL1 and are arranged adjacent to each other in the second direction y may be referred to as a first page PAGE1. Multiple memory cells MC that are connected to the first word line WL1 and to a second string selection line SSL2 and are arranged adjacent to each other in the second direction y may be referred to as a second page PAGE2.

To perform a program operation with respect to a memory cell MC, 0V may be applied to a bit line BL, an on voltage may be applied to a string selection line SSL, and an off voltage may be applied to a ground selection line GSL. The on voltage may be equal to or greater than the threshold voltage so that a string selection transistor SST is turned on, and the off voltage may be smaller than the threshold voltage so that the ground selection transistor GST is turned off. A program voltage may be applied to a memory cell selected from the memory cells MC, and a pass voltage may be applied to the remaining unselected memory cells. In response to the program voltage, electric charges may be injected into the memory cells MC due to F-N tunneling. The pass voltage may be greater than the threshold voltage of the memory cells MC.

To perform an erasure operation with respect to the memory cells MC, an erasure voltage may be applied to the body of the memory cells MC, and 0V may be applied to the word lines WL. Accordingly, data stored in the memory cells MC may be erased at a time.

Figure 8:
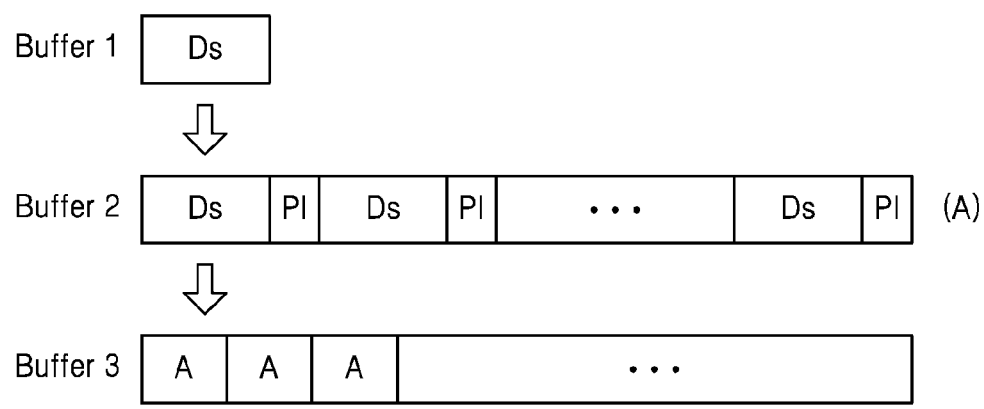
FIG. 8 is a diagram illustrating a process in which a memory controller processes data of a write same command, according to an embodiment.

FIG. 8 is a diagram illustrating a process in which the memory controller 210A or 210B processes data of a write same command, according to an embodiment. The process illustrated in FIG. 8 will be described with reference to the configuration of the memory controller 210A or 210B illustrated in FIG. 4A or 4B.

A data pattern of a write same command that is received from the host 100 has a sector size. For example, the processor 211A or 211B stores a data pattern Ds having a sector size, which is received together with a write same command, in a buffer 1. For example, the buffer 1 may be assigned to a storage area of the RAM 212A or 212B. The buffer 1 has a sector size.

Next, the processor 211A or 211B copies the data pattern Ds having the sector size, stored in the buffer 1, into a buffer 2 by units of pages. For example, the buffer 2 may be assigned to a storage area of the RAM 212A or 212B. The buffer 2 has a page size. The processor 211A or 211B may form data A having the page size by using multiple data patterns Ds and store the data A in the buffer 2. For example, the processor 211A or 211B may add protect information (PI) to the data pattern Ds and store the data pattern Ds with the PI in the buffer 2. For example, the PI may include LBA information.

Next, the processor 211A or 211B copies the data A having the page size, stored in the page 2, into a buffer 3 repeatedly, based on the number of pages corresponding to length information of a write same command For example, the number of times the processor 211A or 211B copies the data A may be equal to the number of pages. For example, the buffer 3 may be assigned to a storage area of the RAM 212A or 212B. In the current embodiment, the buffer 3 corresponds to the buffer memory 201. For example, when the sector size is 512 bytes, the page size is 8K bytes, and the length information of the write same command is "48", the processor 211A or 211B repeatedly copies the data A into the buffer 3 three times. This is because one page includes 16 sectors and a data size of 48 sectors corresponding to sector length information corresponds to 3 pages.

Figure 9A:
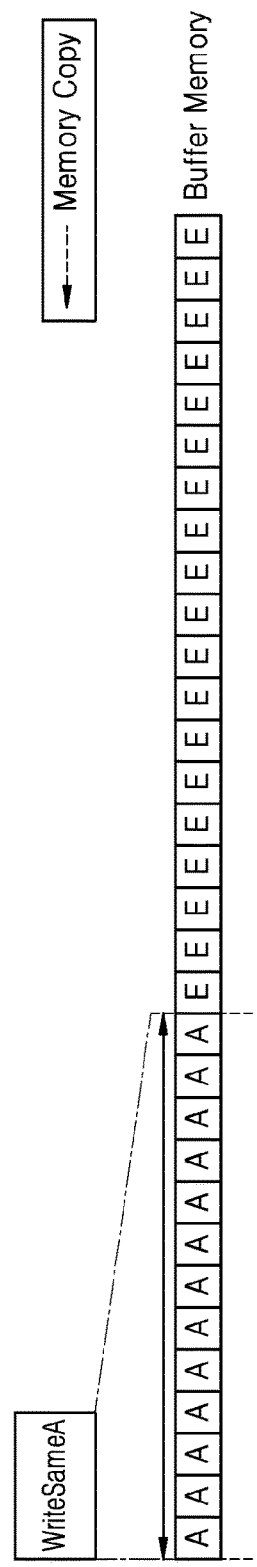
FIGS. 9A and 9B are diagrams illustrating a process in which data of a write same command is copied into a buffer memory of a memory controller, according to an embodiment.
Figure 9B:
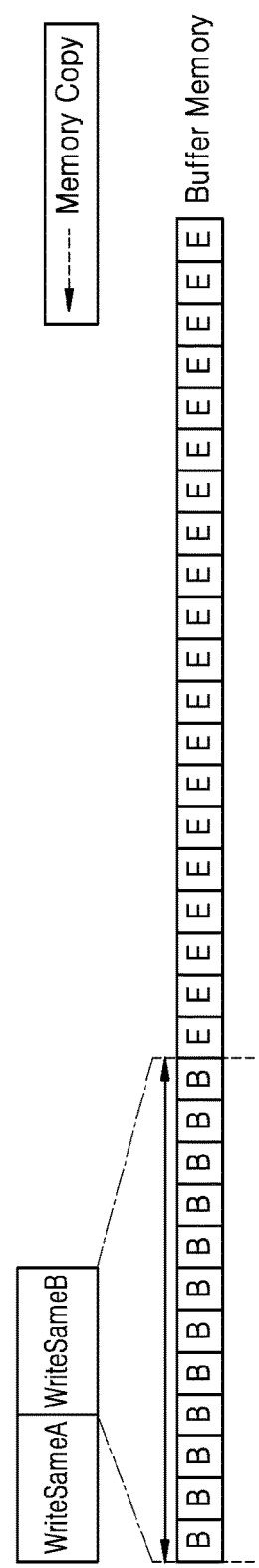

FIGS. 9A and 9B are diagrams illustrating a process in which data of a write same command is copied into the buffer memory 201 of the memory controller 210A or 210B, according to an embodiment. The process illustrated in FIGS. 9A and 9B will be described with reference to the configuration of the memory controller 210A or 210B illustrated in FIG. 4A or 4B.

In this example, a command WriteSame A is a command that directs an operation of repeatedly writing a data pattern A in 13 pages and a command WriteSame B is a command that directs an operation of repeatedly writing a data pattern B in 12 pages. When the command WriteSame A is input to the memory controller 210A or 210B, the processor 211A or 211B repeatedly copies the data pattern A into 13 page buffers of the buffer memory 201, as illustrated in FIG. 9A. The processor 211A or 211B flushes the buffer memory 201 after executing the command WriteSame A.

Accordingly, when the command WriteSame B is input to the memory controller 210A or 210B after the command WriteSame A is executed, the processor 211A or 211B repeatedly copies the data pattern B into 12 page buffers of the buffer memory 201, as illustrated in FIG. 9B. Referring to FIG. 9B, the data pattern A that depends on the previously executed command WriteSame A is not preserved in the buffer memory 201.

Figure 10A:
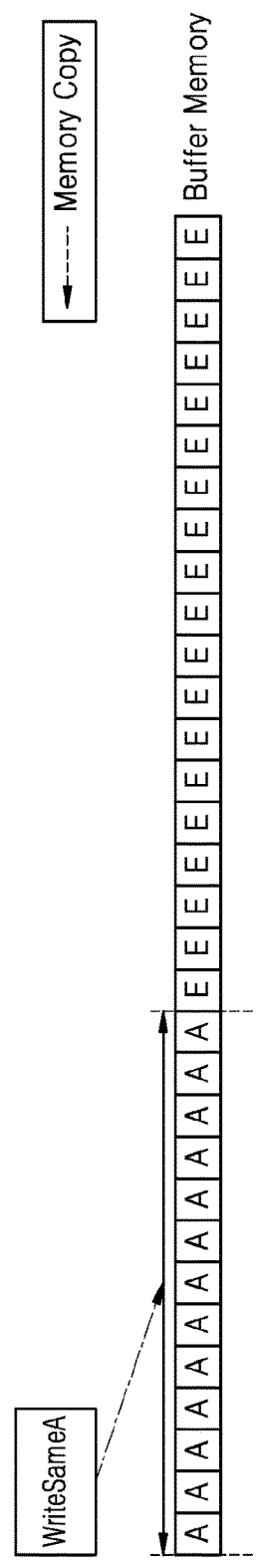
FIGS. 10A through 10C are diagrams illustrating a process in which data of a write same command is copied into a buffer memory of a memory controller, according to another embodiment.
Figure 10B:
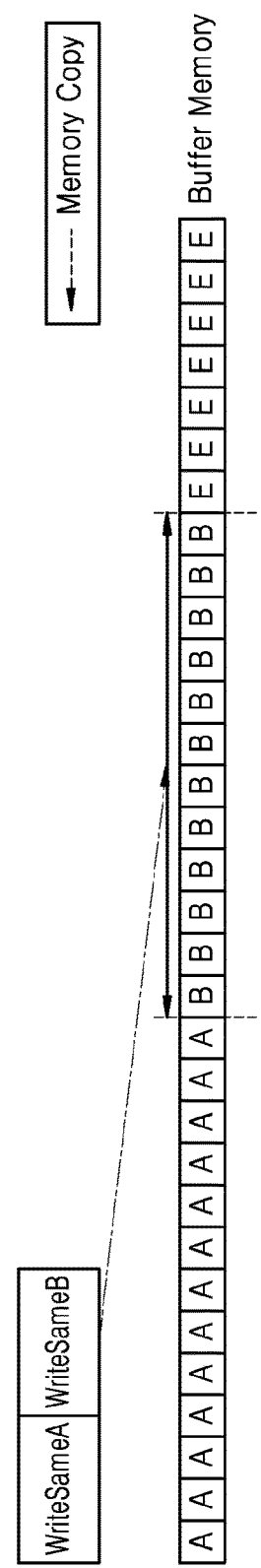
Figure 10C:
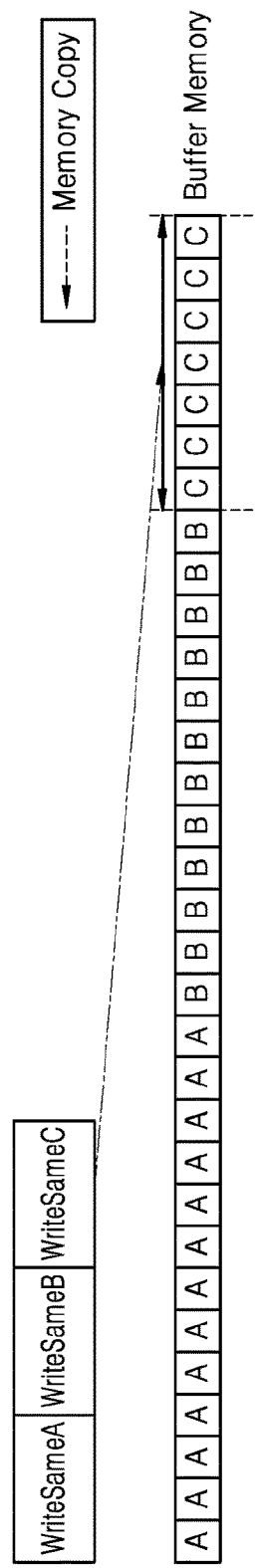

FIGS. 10A through 10C are diagrams illustrating a process in which data of a write same command is copied into the buffer memory 201 of the memory controller 210A or 210B, according to another embodiment. The process illustrated in FIGS. 10A through 10C will be described with reference to the configuration of the memory controller 210A or 210B illustrated in FIG. 4A or 4B.

In this example, commands WriteSame A, WriteSame B, and WriteSame C are sequentially input to the memory controller 210A or 210B. The command WriteSame A is a command directing an operation of repeatedly writing a data pattern A in 13 pages, the command WriteSame B is a command directing an operation of repeatedly writing a data pattern B in 12 pages, and the command WriteSame C is a command directing an operation of repeatedly writing a data pattern C in 7 pages. However, the pages of the commands are not limited to these examples.

When the command WriteSame A is input to the memory controller 210A or 210B, the processor 211A or 211B repeatedly copies the data pattern A into 13 page buffers of the buffer memory 201, as illustrated in FIG. 10A. The processor 211A or 211B does not flush the buffer memory 201 after executing the command WriteSame A. In other words, the data pattern A is still preserved in the buffer memory 201 after the command WriteSame A is executed.

When the command WriteSame B is input to the memory controller 210A or 210B after the command WriteSame A is executed, the processor 211A or 211B repeatedly copies the data pattern B into 12 assigned page buffers located next to the 13 page buffers storing the data pattern A, as illustrated in FIG. 10B.

Next, when the command WriteSame C is input to the memory controller 210A or 210B after the commands WriteSame A and WriteSame B are executed, the processor 211A or 211B repeatedly copies the data pattern C into 7 assigned page buffers located next to the 13 page buffers storing the data pattern A and the 12 page buffers storing the data pattern B, as illustrated in FIG. 10C.

Referring to FIG. 10C, the data patterns A, B, and C are still preserved in the buffer memory 201 after the commands WriteSame A, WriteSame B, and WriteSame C are sequentially executed.

FIGS. 11A through 11H are diagrams illustrating a method of determining the unity of data in the buffer memory 201 of the memory controller 210A or 210B, according to an embodiment. The method illustrated in FIGS. 11A through 11H will be described with reference to the configuration of the memory controller 210A or 210B illustrated in FIG. 4A or 4B.

For example, the memory controller 210A or 210B manages the buffer memory 201 in a manner illustrated in FIGS. 10A through 10C to preserve data of a previously executed command In the buffer memory 201, multiple page buffers may be formed in a ring buffer form. In FIGS. 10A through 10C, an example in which 32 page buffers of the buffer memory 201 are formed in a ring buffer form are illustrated for convenience of description.

The processor 211A or 211B counts the number of times the same data pattern has been consecutively copied in page buffers of the buffer memory 201. For example, in FIGS. 11A through 11H, the counted number of times is represented by a same buffer count value. A state in which data is not stored in a page buffer of the buffer memory 201 is represented by 'E'.

Figure 11A:
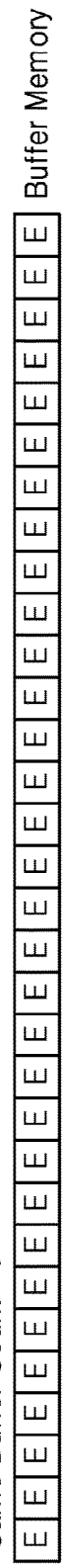
FIGS. 11A through 11H are diagrams illustrating a method of determining the unity of data in a buffer memory of a memory controller, according to an embodiment.
Figure 11B:
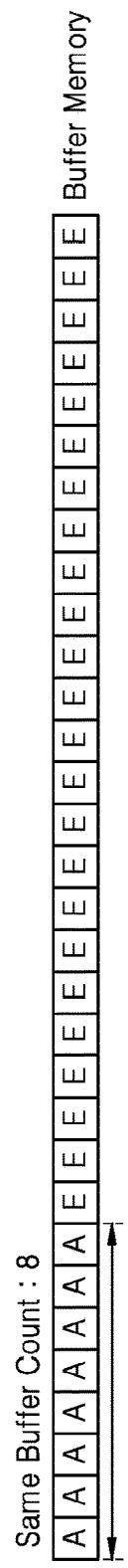

As shown in FIG. 11A, the same buffer count value is '0' in a state in which all page buffers of the buffer memory 201 are empty. As shown in FIG. 11B, the same buffer count value is '8' when a data pattern A is copied into 8 page buffers of the buffer memory 201.

Figure 11C:
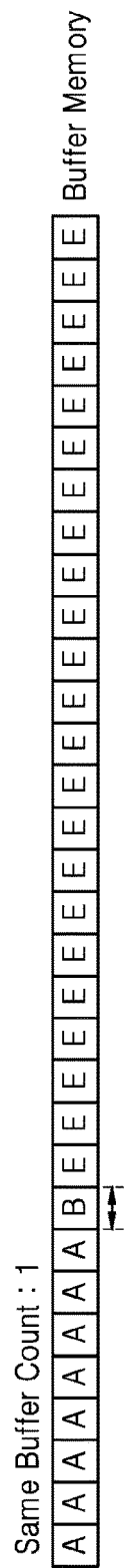

As shown in FIG. 11C, the same buffer count value is changed to '1' when a data pattern B is copied into one page buffer after the data pattern A is copied into the 8 page buffers.

Figure 11D:
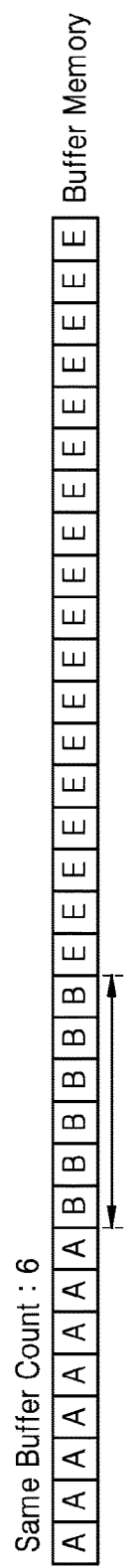

Next, as shown in FIG. 11D, the same buffer count value is changed to '6' when the data pattern B is copied into 5 page buffers after the data pattern B is copied into one page buffer.

Figure 11E:
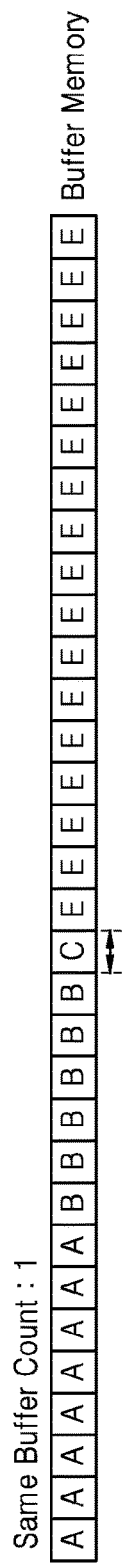

Next, as shown in FIG. 11E, the same buffer count value is changed to '1' when a data pattern C is copied into one page buffer after the data pattern B is copied into the 5 page buffers.

Figure 11F:
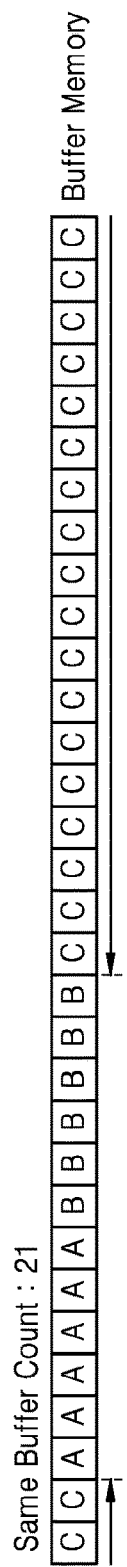

Next, as shown in FIG. 11F, the same buffer count value is changed to '21' when the data pattern C is copied into 20 page buffers after the data pattern C is copied into one page buffer. Referring to FIG. 11F, since the buffer memory 201 is formed in a ring buffer form, page buffers storing the oldest copies of data pattern A are updated with the data pattern C after data is stored in all page buffers. In other words, the data pattern C is copied first in 18 empty page buffers remaining in the buffer memory 201, and then is copied into 2 page buffers storing the data pattern A.

Figure 11G:
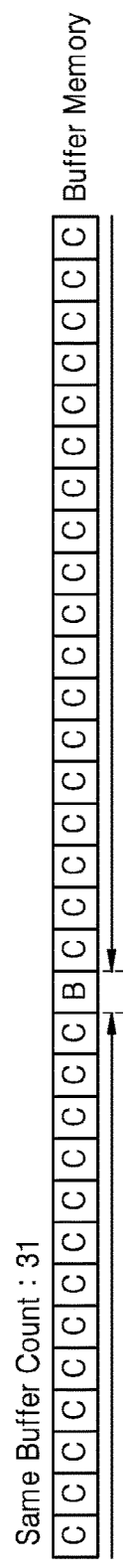

Next, as shown in FIG. 11G, the same buffer count value is changed to '31' when the data pattern C is copied into 10 page buffers after the data pattern C is copied into the 20 page buffers. Referring to FIG. 11G, since the buffer memory 201 is in a state in which data are stored in all page buffers, 10 page buffers storing the oldest data pattern A or B are updated with the data pattern C.

Figure 11H:
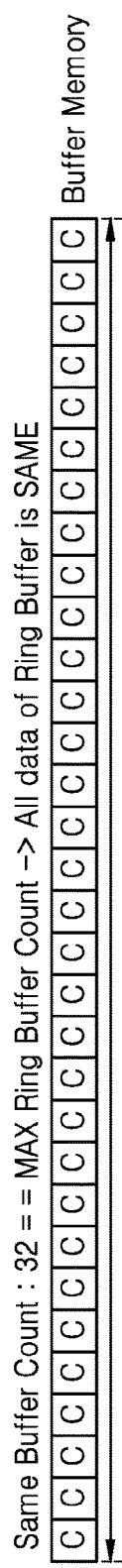

Next, as shown in FIG. 11H, the same buffer count value is changed to '32' when the data pattern C is copied into one page buffer after the data pattern C is copied into the 10 page buffers. Referring to FIG. 11H, since the buffer memory 201 is in a state in which data are stored in all page buffers, one page buffer storing the oldest data pattern B is updated with the data pattern C. As a result, the data pattern C is stored in all page buffers of the buffer memory 201. Accordingly, when the same buffer count value is '32', it may be understood that the same data pattern has been copied into all page buffers of the buffer memory 201.

In other words, when the same buffer count value becomes equal to the total number of page buffers of the buffer memory 201, the same data pattern is copied into all page buffers of the buffer memory 201.

Figure 12:
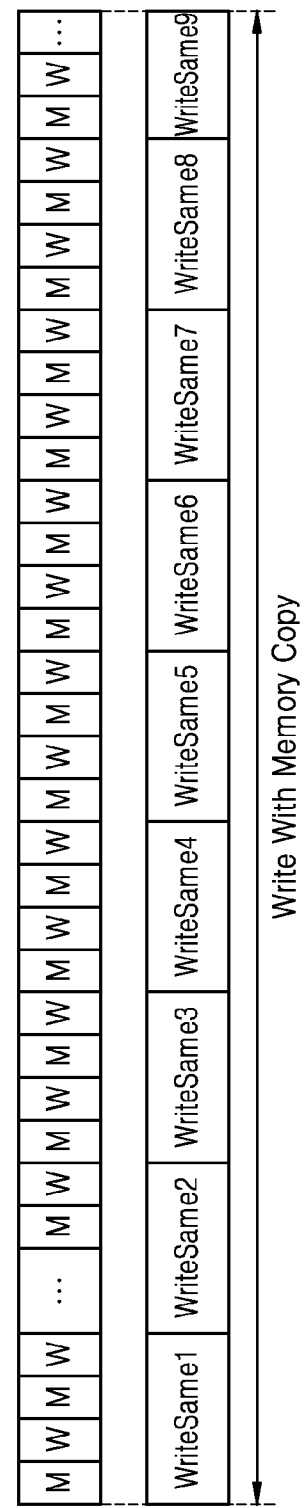
FIG. 12 is a diagram illustrating a process in which a memory controller executes a write same command, according to an embodiment.

FIG. 12 is a diagram illustrating a process in which the memory controller 210A or 210B executes a write same command, according to an embodiment. The process illustrated in FIG. 12 will be described with reference to the configuration of the memory controller 210A or 210B illustrated in FIG. 4A or 4B.

In FIG. 12, a period indicated by 'M' is a period of copying a data pattern into the buffer memory 201, and a period indicated by 'W' is a period of processing a write operation in the processor 211A or 211B by using firmware. In this example, data patterns of commands WriteSame 1 through WriteSame 9 are all the same.

For example, FIG. 12 illustrates a process in which the memory controller 210A or 210B executes a write same command when the memory controller 210A or 210B manages the buffer memory 201 in a manner illustrated in FIGS. 9A and 9B. In other words, FIG. 12 illustrates a process of executing a write same command when the memory controller 210A or 210B manages the buffer memory 201 by using a process in which the processor 211A or 211B flushes the buffer memory 201 after executing one write same command Referring to FIG. 12, whenever the memory controller 210A or 210B receives a write same command, an operation period for copying a data pattern of the write same command into the buffer memory 201 and an operation period for processing a write operation in the processor 211A or 211B by using firmware are required.

Figure 13:
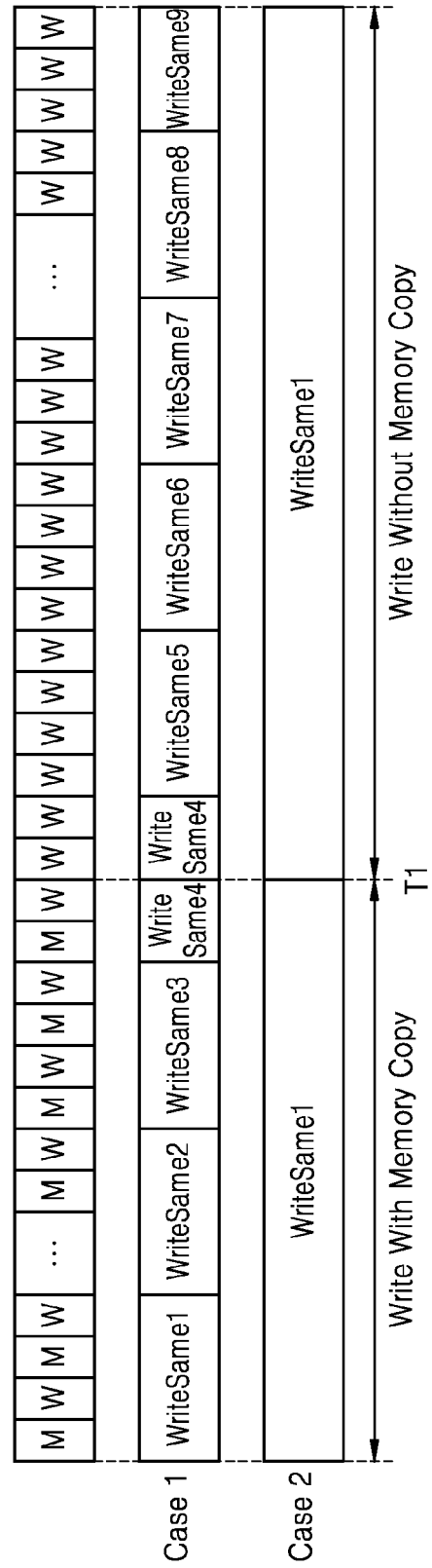
FIG. 13 is a diagram illustrating a process in which a memory controller executes a write same command, according to another embodiment.

FIG. 13 is a diagram illustrating a process in which the memory controller 210A or 210B executes a write same command, according to another embodiment. The process illustrated in FIG. 13 will be described with reference to the configuration of the memory controller 210A or 210B illustrated in FIG. 4A or 4B.

In FIG. 13, a period indicated by 'M' is a period of copying a data pattern into the buffer memory 201, and a period indicated by 'W' is a period of processing a write operation in the processor 211A or 211B by using firmware. In this example, data patterns of commands WriteSame 1 through WriteSame 9 are all the same.

For example, FIG. 13 illustrates a process in which the memory controller 210A or 210B executes a write same command when the memory controller 210A or 210B manages the buffer memory 201 in a manner illustrated in FIG. 10. In other words, FIG. 13 illustrates a process of executing a write same command when the memory controller 210A or 210B manages the buffer memory 201 by using a process in which the processor 211A or 211B preserves data of a previously executed command without flushing the data of the previously executed command.

Referring to FIG. 13, an operation period for copying a data pattern of a write same command into the buffer memory 201 and an operation period for processing a write operation in the processor 211A or 211B by using firmware are required until the same data pattern is copied into all page buffers of the buffer memory 201. For example, an operation period for copying a data pattern of a write same command into the buffer memory 201 and an operation period for processing a write operation in the processor 211A or 211B by using firmware are required until before a time point T1 in which the same data pattern is copied into all page buffers of the buffer memory 201.

However, after the time point T1 in which the same data pattern is copied into all page buffers of the buffer memory 201, the operation of copying a data pattern of a write same command into the buffer memory 201 may be skipped and the processor 211A or 211B may process a write operation by using firmware.

For example, in a case 1 illustrated in FIG. 13, an operation of copying a data pattern of each of commands WriteSame 4 through WriteSame 9 input after the time point T1 into the buffer memory 201 may be skipped and the processor 211A or 211B may process a write operation by using firmware. In other words, a memory copy in the buffer memory 201, that is, an operation of copying a data pattern into the buffer memory 201, is not performed after the time point T1.

As another example, a case 2 illustrated in FIG. 13 shows an example in which the number of pages of a data pattern, which depends on length information of one command WriteSame 1, exceeds the total number of page buffers of the buffer memory 201. In this case, a memory copy in the buffer memory 201, which depends on the command WriteSame 1, is performed only until before the time point T1, and an operation of copying a data pattern into the buffer memory 201 is skipped after the time point T1. Accordingly, after the time point T1, the processor 211A or 211B may process a write operation through firmware by using data previously copied into the buffer memory 201.

Accordingly, referring to FIGS. 12 and 13, management of the buffer memory 201 in a manner illustrated in FIG. 10 is advantageous in terms of performance, compared to a case of managing the buffer memory 201 in a manner illustrated in FIG. 9.

Figure 14:
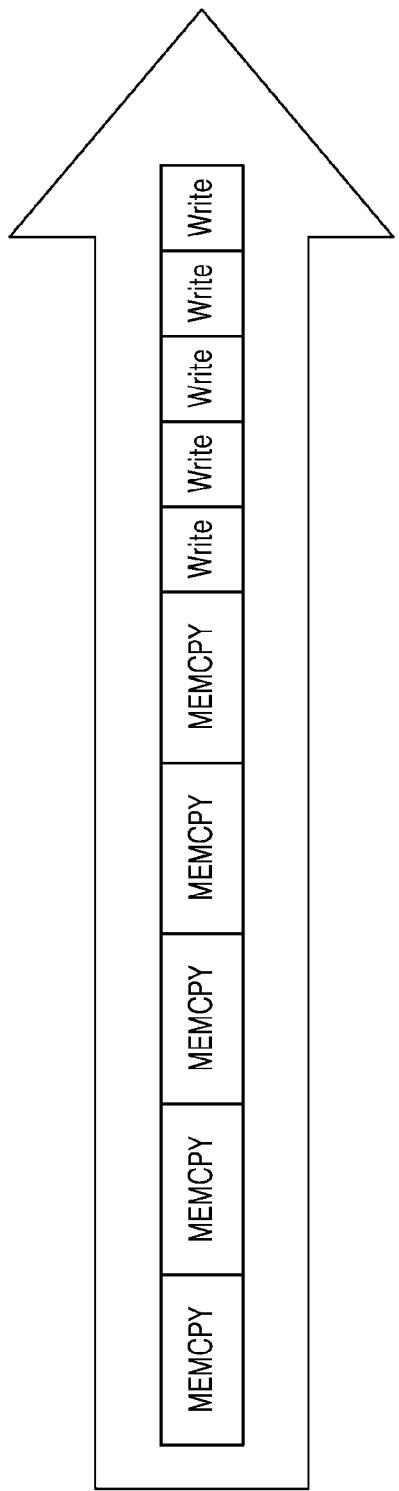
FIG. 14 is a diagram illustrating a process in which a memory controller executes a write same command without using a direct memory access module, according to an embodiment.

FIG. 14 is a diagram illustrating a process in which the memory controller 210A executes a write same command without using a direct memory access module, according to an embodiment. Referring to FIG. 14, an operation MEM-CPY of copying data into the buffer memory 201 and an operation WRITE of executing a write command in the processor 211A by using firmware are performed in series.

Figure 15:
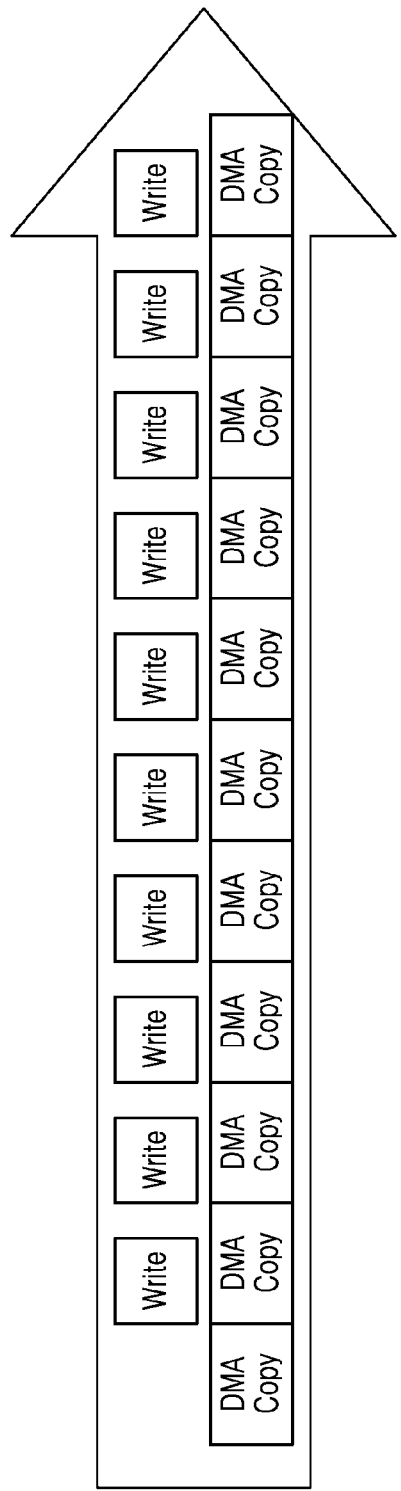
FIG. 15 is a diagram illustrating a process in which a memory controller executes a write same command by using a direct memory access module, according to an embodiment.

FIG. 15 is a diagram illustrating a process in which the memory controller 210B executes a write same command by using the direct memory access module 203, according to an embodiment. Referring to FIG. 15, an operation DMA COPY of copying data into the buffer memory 201 and an operation WRITE of executing a write command in the processor 211A by using firmware are performed in parallel. In other words, an operation DMA COPY of copying data into the buffer memory 201 and an operation WRITE of executing a write command in the processor 211A by using firmware may be independently performed.

Figure 16:
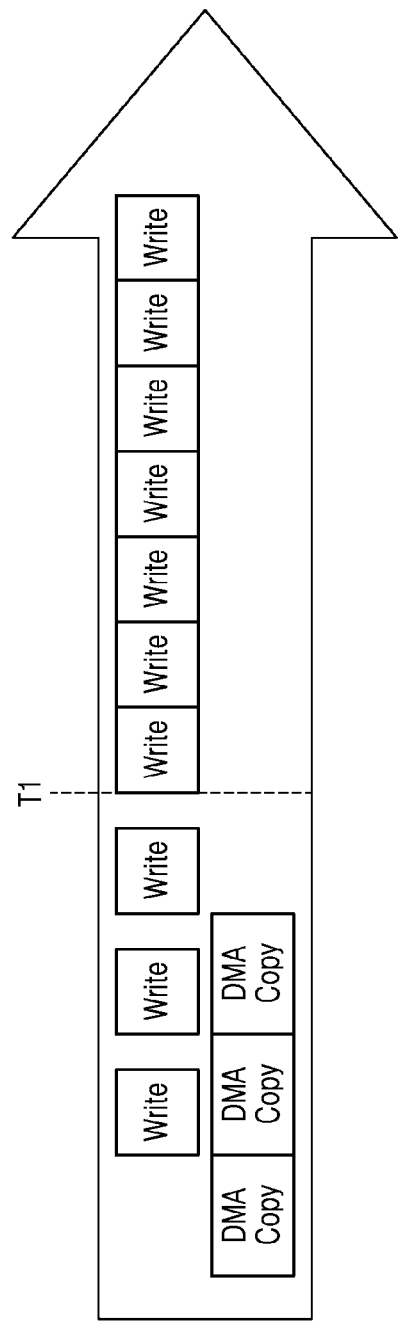
FIG. 16 is a diagram illustrating a process in which a memory controller executes a write same command when the unity of data in a buffer memory is determined, according to an embodiment.

FIG. 16 is a diagram illustrating a process in which the memory controller 210B executes a write same command when the unity of data in the buffer memory 201 is determined, according to an embodiment. Referring to FIG. 16, an operation DMA COPY of copying data into the buffer memory 201 and an operation WRITE of executing a write command in the processor 211B by using firmware are performed in parallel until before a time point T1 in which the same data pattern is copied into all page buffers of the buffer memory 201. After the time point T1 in which the same data pattern is copied into all page buffers of the buffer memory 201, the operation DMA COPY of copying a data pattern of a write same command into the buffer memory 201 is skipped and the processor 211B performs the operation WRITE of executing a write command by using firmware.

FIG. 17 is a flowchart of a method of performing a write operation, according to an embodiment. For example, the method of FIG. 17 may be performed in memory controllers of various types of storage devices including the storage devices illustrated in FIGS. 1A, 1B, 2A, and 2B. For example, the method of FIG. 17 may be performed in the memory controller 210A or 210B illustrated in FIG. 4A or 4B.

The processor 211A or 211B determines whether a command directing a write operation is received from a host (operation S110). An example of the command directing a write operation may include a write same command.

When it is determined that a command directing a write operation is received from the host, the processor 211A or 211B compares data patterns of previously received commands to a data pattern of a currently received command directing a write operation (operation S120). For example, when a cyclical redundancy check (CRC) value included in the data pattern of the currently received command directing a write operation is equal to those included in the data patterns of the previously received commands, it may be determined that the data pattern of the currently received command is the same as those of the previously received commands However, in other embodiments, different techniques of comparing the data pattern to determine if it is the same may be used.

The processor 211A or 211B determines whether the data pattern of the currently received command directing a write operation is the same as those of the previously received commands, stored in all page buffers of the buffer memory 201 (operation S130). For example, the processor 211A or 211B determines whether the same data pattern has been copied into all page buffers of the buffer memory 201 and whether the data pattern of the currently received command directing a write operation is the same as that copied into all the page buffers of the buffer memory 201.

As a result of the operation S130, if it is determined that the data pattern of the currently received command directing a write operation is not the same as those of the previously received commands, stored in all page buffers of the buffer memory 201, an operation of copying the data pattern of the currently received command directing a write operation into the buffer memory 201 is performed (operation S140). For example, when the same data pattern has not been copied into all page buffers of the buffer memory 201 or when the data pattern of the currently received command directing a write operation is not the same as that copied into all the page buffers of the buffer memory 201 although the same data pattern has been copied into all the page buffers of the buffer memory 201, an operation of copying the data pattern of the currently received command directing a write operation into the buffer memory 201 is performed.

As a result of the operation S130, if it is determined that the data pattern of the currently received command directing a write operation is the same as those of the previously received commands, stored in all page buffers of the buffer memory 201, the operation of copying the data pattern of the currently received command directing a write operation into the buffer memory 201 is skipped and an operation of writing data in the memory device 220 is performed by using data copied into the buffer memory 201 (operation S150). In addition, after the operation S140 is performed, an operation of writing data in the memory device 220 is also performed by using data copied into the buffer memory 201.

FIG. 18 is a flowchart of a method of managing a buffer memory, according to an embodiment. For example, the method of FIG. 18 may be performed in memory controllers of various types of storage devices including the storage devices illustrated in FIGS. 1A, 1B, 2A, and 2B. For example, the method of FIG. 17 may be performed in the memory controller 210A or 210B illustrated in FIG. 4A or 4B.

The processor 211A or 211B performs an operation of sequentially copying data patterns of commands received from a host into the buffer memory 201 (operation S210). For example, when write same commands are sequentially received from the host, the processor 211A or 211B sequentially copies data patterns of the write same commands received from the host into the buffer memory 201. For example, the processor 211A or 211B sequentially copies data patterns of write same commands into the buffer memory 201 in a manner of preserving data patterns of previously executed commands, as illustrated in FIG. 10.

Next, the processor 211A or 211B determines whether the same data pattern has been copied into all page buffers of the buffer memory 201 (operation S220). For example, the processor 211A or 211B may determine whether the same data pattern has been copied into all page buffers of the buffer memory 201 by using a same buffer count value as illustrated in FIG. 11.

As a result of the operation S220, when it is determined that the same data pattern has been copied into all page buffers of the buffer memory 201, the processor 211A or 211B determines whether a data pattern of a currently received write same command is the same as that copied in all page buffers of the buffer memory 201 (operation S230).

When it is determined that the same data pattern has not been copied into all page buffers of the buffer memory 201, as a result of the operation S220, or when it is determined that the data pattern of the currently received write same command is not the same as that copied in all page buffers of the buffer memory 201, as a result of the operation S230, the processor 211A or 211B performs an operation of copying the data pattern of the currently received write same command into the buffer memory 201 (operation S240). For example, the data pattern of the currently received write same command may be copied into the buffer memory 201 in a manner illustrated in FIG. 10 or 11.

As a result of the operation S230, when it is determined that the data pattern of the currently received write same command is the same as that copied in all page buffers of the buffer memory 201, the processor 211A or 211B skips the operation of copying the data pattern of the currently received write same command into the buffer memory 201 (operation S250).

FIG. 19 is a flowchart of a write operation method that is performed in a computing system, according to an embodiment. The write operation method may be performed in various types of computing systems including the computing systems included in FIGS. 1A, 1B, 2A, and 2B. A write command execution method that is performed in the computing system 1000A of FIG. 1 will be described for convenience of description.

The computing system 1000A may be divided into a host system, an HIL, and an FTL in terms of software. The host system is performed in the firmware of the host 100, and the HIL and the FTL are performed in the firmware of the storage device 200A.

The host system generates a write same command including one sector size data pattern and sector length information and transmits the generated write same command to the HIL (operation S310).

In the HIL, it is determined whether the one sector size data pattern of the write same command is the same as data patterns of previously received commands (operation S320). For example, when a CRC value included in the one sector size data pattern is the same as those included in the data patterns of the previously received commands, it may be determined that the one sector size data pattern of the write same command is the same as the data patterns of the previously received commands As another example, all bits of the one sector size data pattern may be compared with all bits of each of the data patterns of the previously received commands.

Next, in the HIL, the one sector size data pattern of the write same command is duplicated to obtain one page size data pattern (operation S330).

Next, the one page size data pattern obtained by the duplication of the one sector size data pattern, logical page number (LPN) length information, and pattern detection result information is transmitted to the FTL (operation S340). The LPN length information corresponds to length information obtained by converting sector length information included in the write same command into page length information. The pattern detection result information corresponds to result information obtained by determining whether the one sector size data pattern of the write same command is the same as the data patterns of the previously received commands.

In the FTL, it is determined whether the pattern detection result information received from the HIL indicates that one sector size data pattern of a currently received write same command is the same as a data pattern of a previously executed command (operation S350).

As a result of the operation S350, if it is determined that the pattern detection result information received from the HIL indicates that the one sector size data pattern of the currently received write same command is the same as the data pattern of the previously executed command, it is determined whether the data pattern of the currently received write same command has been copied into all page buffers of the buffer memory 201 (operation S360).

If it is determined that the pattern detection result information received from the HIL indicates that the one sector size data pattern of the currently received write same command is not the same as the data pattern of the previously executed command, as a result of the operation S350, or when it is determined that the data pattern of the currently received write same command has not been copied into all page buffers of the buffer memory 201, as a result of the operation S360, the one page size data pattern received from the HIL is copied into the buffer memory 201 by the number of times corresponding to the LPN length information (operation S370).

As a result of the operation S360, if it is determined that the data pattern of the currently received write same command has been copied into all page buffers of the buffer memory 201, a write operation is performed by using data copied into the buffer memory 201 (operation S380). Accordingly, when the data pattern of the currently received write same command has been copied into all page buffers of the buffer memory 201, an operation of copying the data pattern of the currently received write same command into the buffer memory 201 may be skipped.

A storage device according to any of the above embodiments may be embedded using various types of packages. For example, the storage device may be embedded using packages, such as package on package (POP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline (TSOP), system in package (SIP), multi chip package (MCP), wafer-level fabricated package (WFP), and wafer-level processed stack package (WSP).

While embodiments have been particularly shown and described with reference to the drawings, it will be understood that various changes in form and details may be made in other embodiments without departing from the spirit and scope of the following claims.

What is claimed is:

1. A method of performing a write operation, the method comprising:
   comparing a data pattern of a currently received command directing a write operation to data patterns of at least one previously received command; and
   performing a write operation, based on the currently received command directing the write operation, by writing the data patterns of the at least one previously received command instead of the data pattern of the currently received command when the data pattern of the currently received command directing the write operation is identical to the data patterns of the at least one previously received command.

2. The method of claim 1, wherein:
   the currently received command directing the write operation comprises a write same command; and
   the write same command is a command directing an operation of writing a data pattern to two or more pages.

3. The method of claim 1, wherein the comparing comprises comparing a cyclical redundancy check (CRC) value included in the data pattern of the currently received command to a CRC value included in the data patterns of the previously received commands.

4. The method of claim 1, wherein
   the comparing is performed in a host interface layer (HIL) of a memory controller, and information about a pattern comparison result is transmitted from the HIL to a flash translation layer (FTL), and
   the performing of the write operation comprises determining, in the FTL, whether or not to reuse the data patterns of the previously received commands, based on the information about the pattern comparison result.

5. The method of claim 4, further comprising:
   generating, in the HIL, page size data pattern and page length information in response to a write same command received from a host from sector size data pattern and sector length information of the write same command; and
   transmitting the information about the pattern comparison result to the FTL along with the page size data pattern and the page length information.

6. The method of claim 5, further comprising, in the FTL:
   sequentially copying the page size data pattern to a buffer memory by a number of times corresponding to the page length information when the information about the pattern comparison result indicates that the data pattern of the currently received command directing the write operation is not the same as all of the data patterns of the previously received commands stored in page buffers in the buffer memory; and omitting copying the page size data pattern to the buffer memory when the information about the pattern comparison result indicates that the data pattern of the currently received command directing the write operation is the same as all of the data patterns of the previously received commands stored in page buffers in the buffer memory.

7. The method of claim 1, wherein the performing of the write operation comprises sequentially copying the data patterns of the previously received commands to page buffers in a buffer memory, and skipping an operation of copying the data pattern of the currently received command directing the write operation to the buffer memory, when a same data pattern has been copied to all page buffers in the buffer memory and the data pattern of the currently received command directing the write operation is identical to the data pattern copied to all the page buffers in the buffer memory.

8. The method of claim 7, wherein the buffer memory comprises a ring buffer memory including the page buffers, and the performing of the write operation further comprises:
counting a number of page buffers to which the same data pattern has been consecutively copied; and
determining that the same data pattern has been copied to all the page buffers in the buffer memory when the counted number of page buffers is equal to a total number of page buffers included in the buffer memory.

9. The method of claim 8, further comprising resetting the count of the number of page buffers to which the same data pattern has been consecutively copied when a data pattern of a subsequently received command is different from the data pattern of the currently received command.

10. The method of claim 7, wherein the operation of copying the data pattern to the buffer memory and an operation of executing in firmware the currently received command directing the write operation are performed in parallel.

11. A method of managing a buffer memory, the method comprising:

receiving a command to write a data pattern;

sequentially copying the data pattern of the command to the buffer memory if the data pattern is not identical to all data patterns stored in buffer memory;

omitting copying the data pattern of the command to the buffer memory if the data pattern is identical to all data patterns stored in buffer memory; and writing at least one data pattern stored in the buffer memory in response to the command.

12. The method of claim 11, wherein:

the buffer memory comprises a ring buffer memory including page buffers;

sequentially copying the data pattern of the command to the buffer memory comprises sequentially copying the data pattern of the command to the buffer memory if the data pattern is not identical to data patterns stored in all page buffers of the buffer memory; and omitting copying the data pattern of the command to the buffer memory comprises omitting copying the data pattern of the command to the buffer memory if the data pattern is identical to data patterns stored in all page buffers of the buffer memory.

13. The method of claim 11, further comprising:

comparing a cyclical redundancy check (CRC) value included in the data pattern to CRC values of the data patterns stored in buffer memory; and determining whether to sequentially copy or omit copying the data pattern of the command to the buffer memory in response to the comparison.

14. The method of claim 11, wherein sequentially copying the data pattern to the buffer memory and writing the at least one data pattern are performed in parallel.

15. A method, comprising:

receiving a command to write a data pattern;

determining if the data pattern is the same as data patterns stored in a buffer memory;

if the data pattern is not the same as the data patterns stored in the buffer memory:
writing the data pattern to the buffer memory; and
writing the data patterns written to the buffer memory to a memory device; and if the data pattern is the same as the data patterns stored in the buffer memory, writing at least one of the data patterns stored in the buffer memory to the memory device without writing the data pattern to the buffer memory.

16. The method of claim 15, wherein determining if the data pattern is the same as the data patterns stored in the buffer memory comprises comparing a cyclical redundancy check (CRC) value associated with the data pattern with CRC values of the data patterns stored in the buffer memory.

17. The method of claim 15, further comprising:

maintaining a count of identical data patterns stored in the buffer memory;

wherein determining if the data pattern is the same as the data patterns stored in the buffer memory comprises determining if the count of identical data patterns stored in the buffer memory is equal to a size of the buffer memory.

18. The method of claim 15, wherein:

receiving the command comprises receiving a sector size data pattern; and the method further comprises duplicating the sector size data pattern to fill a page size data pattern in the buffer memory.

19. The method of claim 15, wherein:

the command comprises a write same command; and the write same command is a command directing an operation of writing a data pattern to two or more pages.

20. The method of claim 15, wherein:

determining if the data pattern is the same as the data patterns stored in the buffer memory is performed in a host interface layer (HIL) of a memory controller; and writing of data patterns from the buffer memory to the memory device is performed in a flash translation layer (FTL).

* * * * *